(12) United States Patent
Jungmayr et al.

(10) Patent No.: US 7,825,558 B2
(45) Date of Patent: Nov. 2, 2010

(54) FAN WITH ACTIVE MAGNETIC BEARING

(75) Inventors: Gerald Jungmayr, Traun (AT); Wolfgang Amrhein, Ottensheim (AT)

(73) Assignee: EBM - Papst St. Georgen GmbH and Co. KG, St. Georgen (DE)

( * ) Notice: Subject to any disclaimer, the term of this patent is extended or adjusted under 35 U.S.C. 154(b) by 330 days.

(21) Appl. No.: 11/856,096

(22) Filed: Sep. 17, 2007

(65) Prior Publication Data
US 2008/0074010 A1 Mar. 27, 2008

(30) Foreign Application Priority Data
Sep. 22, 2006 (DE) .................. 10 2006 046 434

(51) Int. Cl.
H02K 1/27 (2006.01)
H02K 7/09 (2006.01)
F04D 25/06 (2006.01)
F04D 29/058 (2006.01)

(52) U.S. Cl. .......................... 310/90.5; 310/51; 310/268; 417/365; 417/423.12

(58) Field of Classification Search .................. 310/51, 310/68 B, 90.5, 268; 417/365, 423.12
See application file for complete search history.

(56) References Cited

U.S. PATENT DOCUMENTS

| 3,731,984 | A |   | 5/1973 | Habermann | 308/10 |
|---|---|---|---|---|---|
| 4,787,829 | A | * | 11/1988 | Miyazaki et al. | 417/353 |
| 5,152,679 | A | * | 10/1992 | Kanemitsu et al. | 417/423.4 |
| 5,572,079 | A | * | 11/1996 | Pinkerton | 310/90.5 |
| 5,682,071 | A |   | 10/1997 | Buhler | 310/90.5 |
| 5,928,131 | A | * | 7/1999 | Prem | 600/16 |
| 6,265,798 | B1 |   | 7/2001 | Huang et al. | 310/90.5 |

(Continued)

FOREIGN PATENT DOCUMENTS

CA    2 352 270    6/2000

(Continued)

OTHER PUBLICATIONS

Schweitzer, Traxler& Bleuler, "Grundlagen . . . ISBN 3-540-55868-3", © 1993, Springer, Berlin & NYC, pp. 82-88.

(Continued)

Primary Examiner—Quyen Leung
Assistant Examiner—David W. Scheuermann
(74) Attorney, Agent, or Firm—Oliver Intellectual Property; Milton Oliver, Esq.

(57) ABSTRACT

A fan (100) has an electronically commutated drive motor (ECM 52) with a stator (50) connected to a bearing tube (54) and a rotor (22) on a shaft (34). The shaft (34) is journaled in the tube (54) using passive radial magnetic bearings (16, 18) to minimize friction and wear, is axially displaceable with respect to the tube (54), and is drivingly connected to a rotor magnet (44) forming a first magnetic yoke (46). A second magnetic yoke (27) is connected to the shaft (34), and has an inner surface (59) defining a substantially cylindrical air gap (57) through which, during operation, a radial magnetic flux (55') extends. A plunger coil (64) extends into the air gap (57) and is mechanically connected to the tube (54) so that, upon axial displacement of the plunger coil (64), the position of the shaft (34) with respect to the tube (54) changes.

25 Claims, 20 Drawing Sheets

U.S. PATENT DOCUMENTS

| | | | |
|---|---|---|---|
| 6,447,265 B1* | 9/2002 | Antaki et al. ............... | 417/354 |
| 6,617,732 B1 | 9/2003 | Lin et al. ................... | 310/90.5 |
| 6,727,618 B1 | 4/2004 | Morrison et al. ........... | 310/90.5 |
| 6,784,581 B1 | 8/2004 | Chen et al. ................. | 310/90.5 |
| 6,841,904 B2 | 1/2005 | Sano et al. .................... | 310/71 |
| 7,023,117 B2 | 4/2006 | Fremerey .................... | 310/90.5 |
| 7,082,763 B2 | 8/2006 | Fremery et al. ............... | 60/598 |
| 7,105,967 B2 | 9/2006 | Huang et al. ............... | 310/90.5 |
| 7,276,828 B2 | 10/2007 | Yeh et al. ................... | 310/90.5 |
| 2003/0141772 A1 | 7/2003 | Abel ......................... | 310/90.5 |
| 2003/0155829 A1 | 8/2003 | McMullen et al. ......... | 310/90.5 |
| 2004/0046467 A1 | 3/2004 | Huang et al. ............... | 310/90.5 |
| 2005/0140228 A1 | 6/2005 | Yeh et al. ................... | 310/90.5 |
| 2005/0184609 A1 | 8/2005 | Chen et al. ................. | 310/90.5 |
| 2006/0055259 A1 | 3/2006 | Hanlon et al. ............... | 310/90.5 |

FOREIGN PATENT DOCUMENTS

| | | |
|---|---|---|
| CH | 608868 | 1/1979 |
| DE | 29 19 236 | 11/1980 |
| DE | 38 18 556 | 6/1988 |
| DE | 39 44 563 | 11/1989 |
| DE | 40 38 382 | 12/1990 |
| DE | 40 38 383 | 12/1990 |
| DE | 42 27 013 | 8/1992 |
| DE | 42 10 741 | 10/1993 |
| DE | 198 23 630 | 12/1999 |
| DE | 200 19 530 U | 1/2001 |
| DE | 100 07 428 A | 6/2001 |
| DE | 100 43 235 | 3/2002 |
| DE | 203 04 493 U | 3/2003 |
| DE | 203 04 493 U | 6/2003 |
| DE | 102 16 447 C | 9/2003 |
| DE | 103 38 167 | 4/2005 |
| DE | 20 2004 020 504 U | 8/2005 |
| EP | 0 899 855 A | 3/1999 |
| EP | 1 058 368 A | 12/2000 |
| EP | 1 325 239 B | 4/2004 |
| EP | 1 578 005 A2 | 9/2005 |
| EP | 1 313 960 B | 12/2005 |
| GB | 2 666 009 A | 10/1993 |
| WO | WO 98-32981 A | 7/1998 |
| WO | WO 99-42731 A | 8/1999 |
| WO | WO 02-27205 A | 4/2002 |

OTHER PUBLICATIONS

Matthias Lang, Dissertation: "Berechnung & Optimierung . . . Lagern", ISBN 3-18-335721-6 (Tech. Univ. Berlin, 2003), pp. 7, 88-95, 105-106.

Schöb & Baumschlager, Theorie & Praxis der Magnetlagertechnik (Zürich, date post-1997), pp. 3-14, 17 & 20.

Olaf Petzold, Dissertation: "Modelbildung & Untersuchung eines magnetisch gelagerten Rundtisches" (Oct. 2006), University of Magdeburg, Germany, pp. VII-IX (table of contents) & 159-166 (bibliography).

D.Vischer & H. Bleuler (both ETH), "Self-Sensing Active Magnetic Levitation," IEEE Transactions on Magnetics vol. 29, No. 2, Mar. 1993, pp. 1276-12821(0018-9464/93$03.00).

Mecos Traxler AG, "About Us." (Zurich, Switzerland, downloaded Aug. 13, 2007 from www.MECOS.com), 1 page.

Bill Giovino, "New Microchip dsPIC33 Digital Signal Controller Family," Oct. 2005, (2 pp. found at www.microcontroller.com/news/printer_microchip_dsPIC33.asp).

* cited by examiner

FAN WITH ACTIVE MAGNETIC BEARING

CROSS-REFERENCE

This application claims priority of German application DE 10 2006 046 434.6 filed 22 Sep. 2006, the content of which is hereby incorporated by reference.

FIELD OF THE INVENTION

The present invention relates to a fan having an electronically commutated drive motor for driving fan blades. A drive motor of this kind has a stator and has a rotor equipped with a shaft, and its shaft is journaled within the stator.

BACKGROUND

Fans today are usually driven by electronically commutated motors. A bearing system for the fan wheel without mechanical bearings is desirable in such motors, principally for reasons of service life but also because of bearing noise. This applies in particular to fast-running fans such as those used, for example, to ventilate computer servers.

Arrangements having permanent magnets are known for journaling without mechanical bearings. This is also referred to as a "non-contact bearing system" or as "magnetically journaled drive systems." There are two types of so-called passive bearings, i.e. bearings that operate without external energy delivery:

Magnetic bearings that are axially stable but radially unstable.

Magnetic bearings that are radially stable but axially unstable.

SUMMARY OF THE INVENTION

It is an object of the invention to make available a novel fan with magnetic bearings offering a high level of stability and reliability.

According to the present invention, this object is achieved by using a plurality of passive magnetic bearings to journal the rotor shaft within the stator, using an inner surface of a fan wheel to define a cylindrical air gap, and providing a plunger coil which extends into this air gap so that, upon axial displacement of the shaft with respect to the stator, the location of the plunger coil, with respect to the air gap, changes. A flux sensor, which detects the resulting change in flux, then produces a signal which can be used to actively control an axial magnetic bearing. This makes possible a compact and mechanically robust design, since a fan in any case requires a fan wheel that is driven by the rotor of the electronically commutated motor. In the context of the invention, the space inside the fan wheel is used to create a cylindrical air gap.

In the latter, an approximately radially extending magnetic field is generated, in which is located a plunger coil that is mechanically connected to the stator. As a function of the current in the plunger coil, the axial location or elevation of the fan wheel, and thus of the rotor relative to the stator, can be actively controlled, thereby yielding an actively controlled magnetic axial bearing having a simple structure. This minimizes friction and noise during operation, and lengthens the service life. It is possible, in this context, to maintain a low current through the plunger coil and thereby to reduce any negative influence on fan efficiency.

It is possible in this fashion to ensure friction-free, non-contact running of the rotor for fans in any mounting orientation (horizontal, vertical, etc.). Because the fan wheel levitates freely, the service life of the fan is increased and its noise output is reduced. An arrangement of this kind can also absorb the dead weight of the rotor as well as other forces acting in the axial direction, e.g. flow forces, electromagnetic forces, vibration forces, shock forces. This will also become clear from the description that follows. The elimination of bearing friction can furthermore improve efficiency.

BRIEF FIGURE DESCRIPTION

Further details and advantageous refinements of the invention are evident from the exemplifying embodiments, in no way to be understood as a limitation of the invention, that are described below and depicted in the drawings.

FIG. 1 is a longitudinal section through the rotor of a fan in which annular permanent magnets that are components of passive magnetic radial bearings 16 and 18 are arranged on rotor shaft 34;

Figure 3:
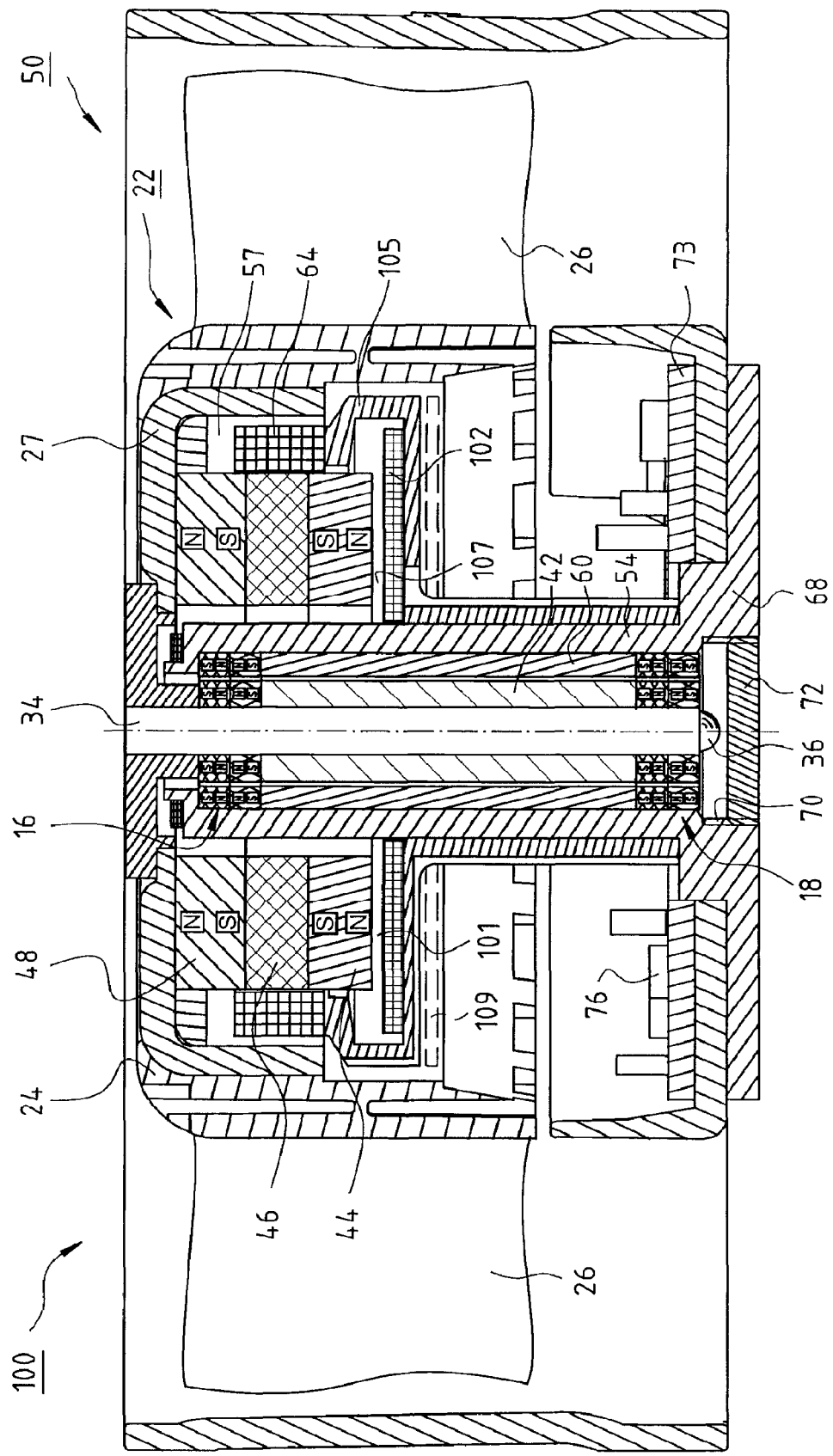
FIG. 3 depicts the fan according to FIGS. 1 and 2 in the assembled state; the fan is depicted in a state in which the active axial bearing is activated, i.e. the rotor is "levitating"
Figure 8:
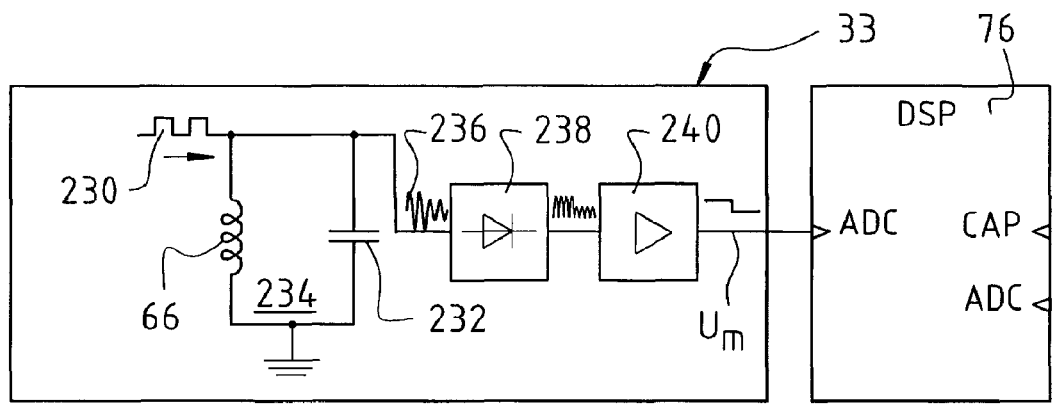
Figure 9:
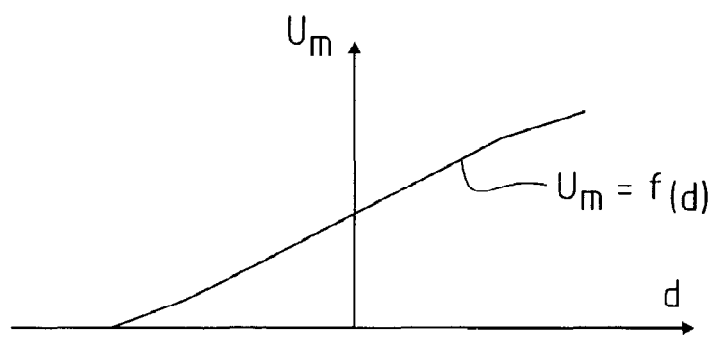
Figure 10:
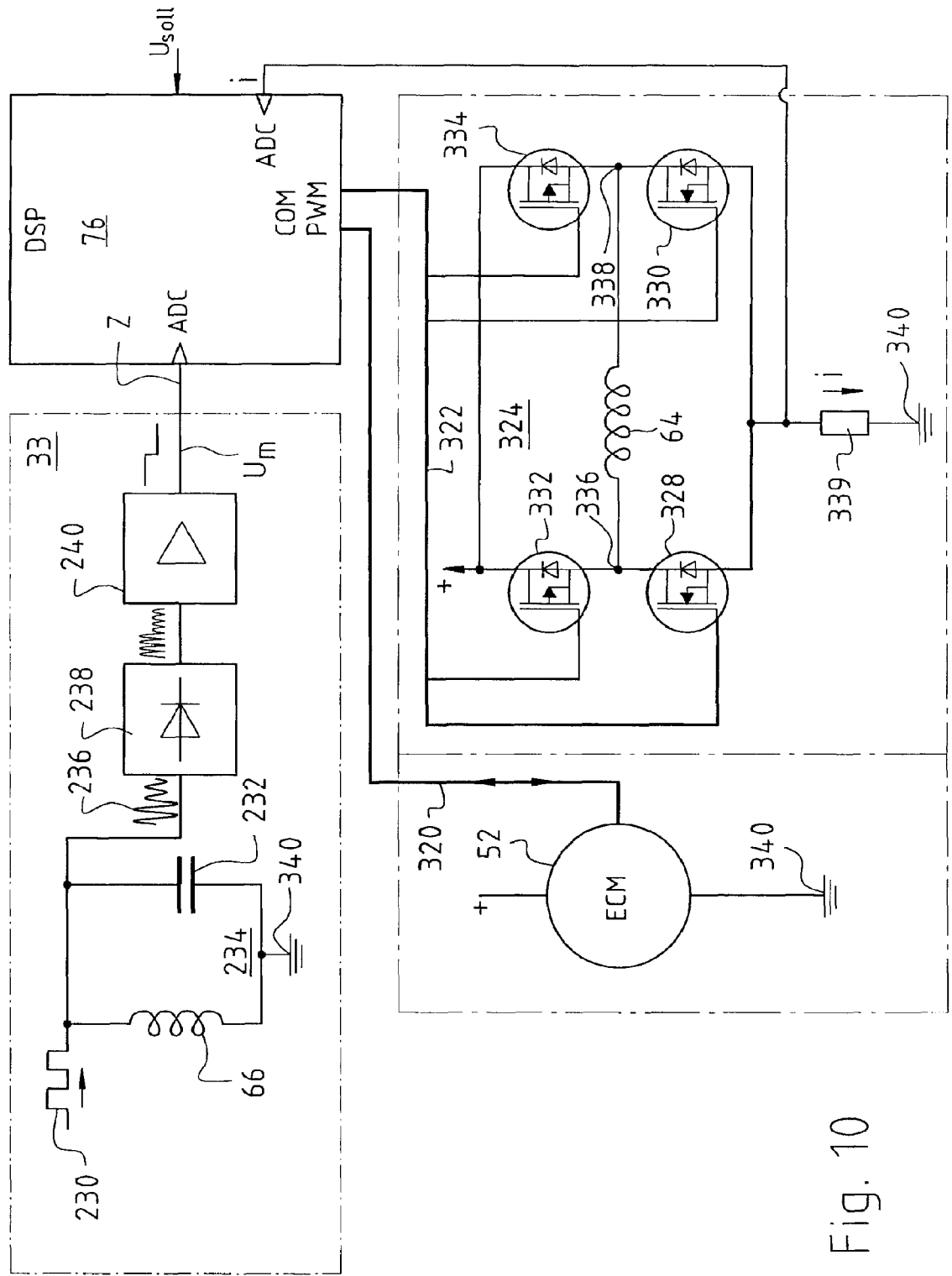
Figure 11:
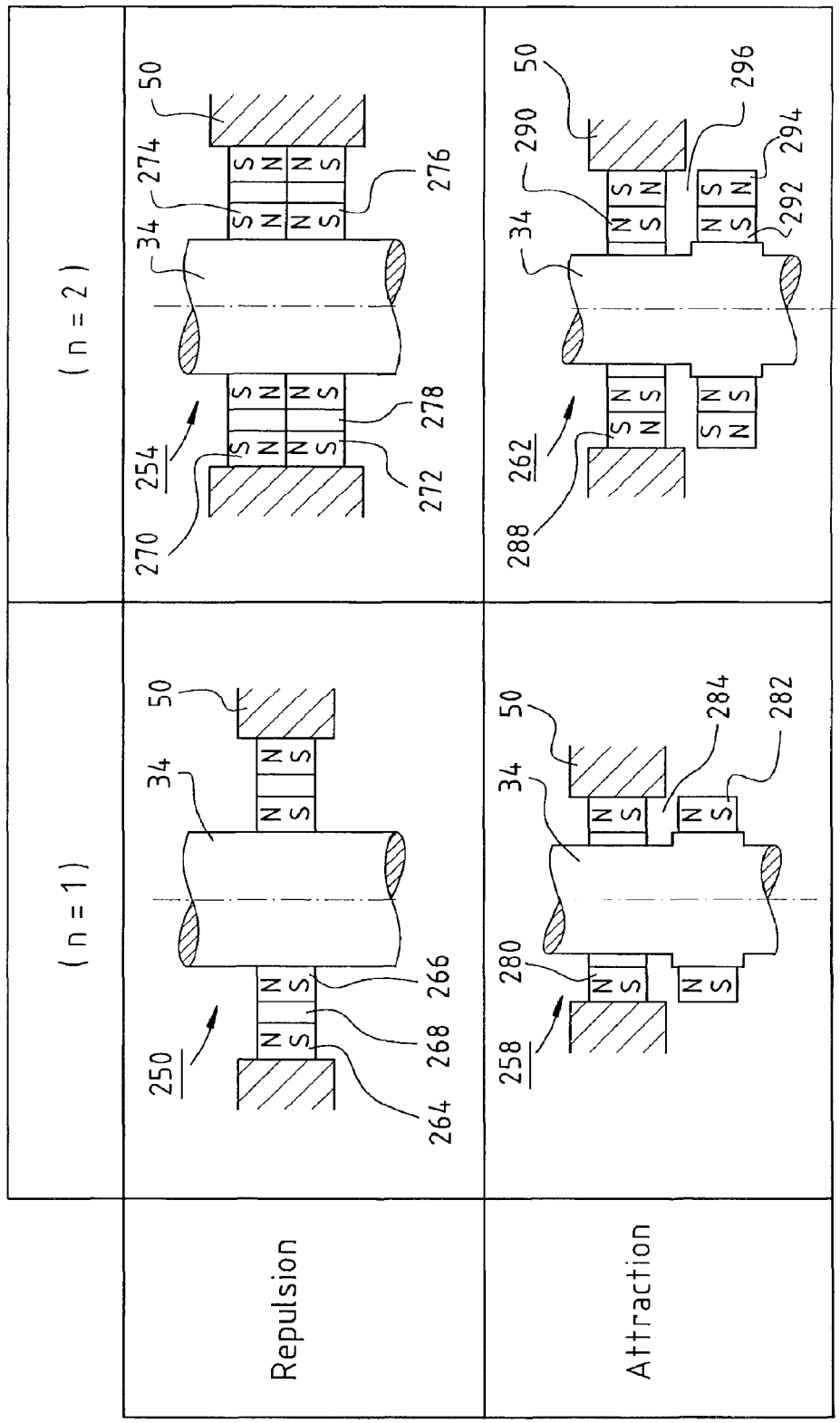
Figure 12:
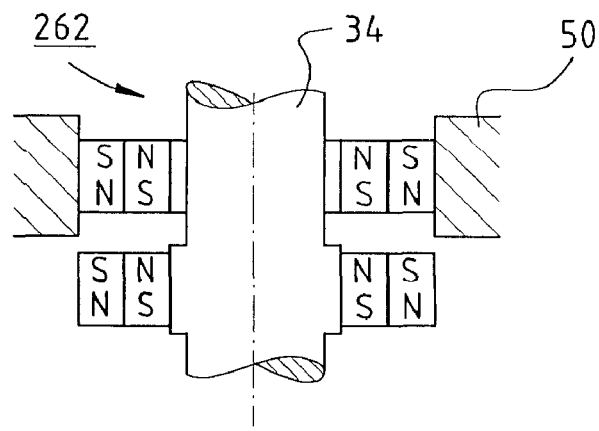
Figure 13:
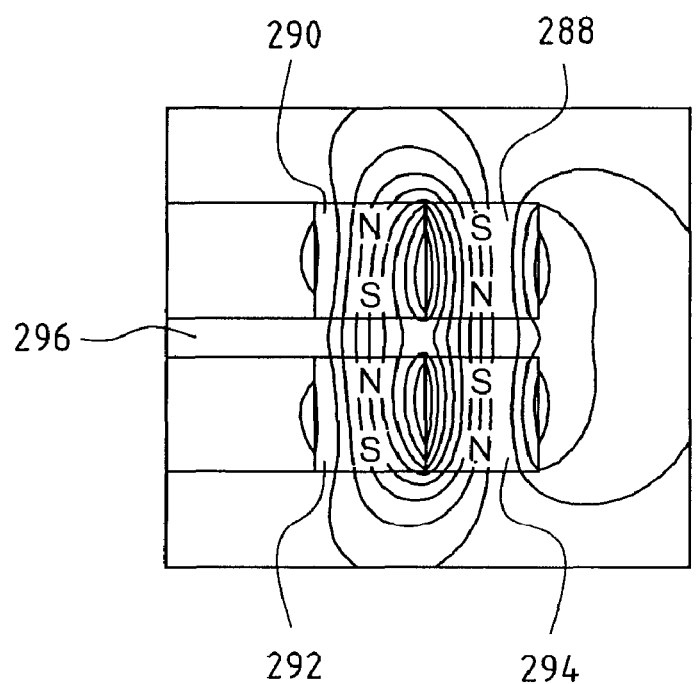
Figure 14:
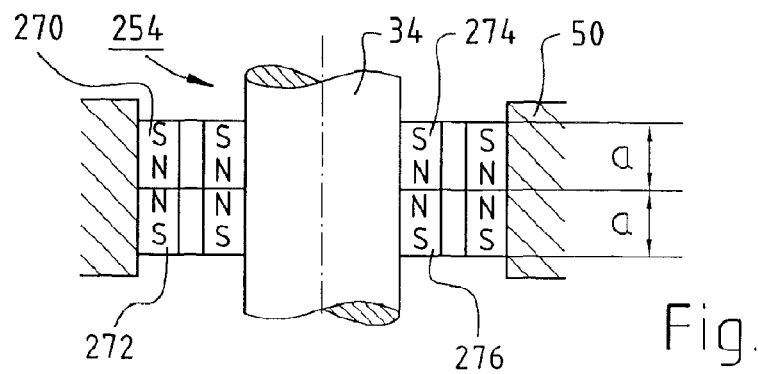
Figure 15:
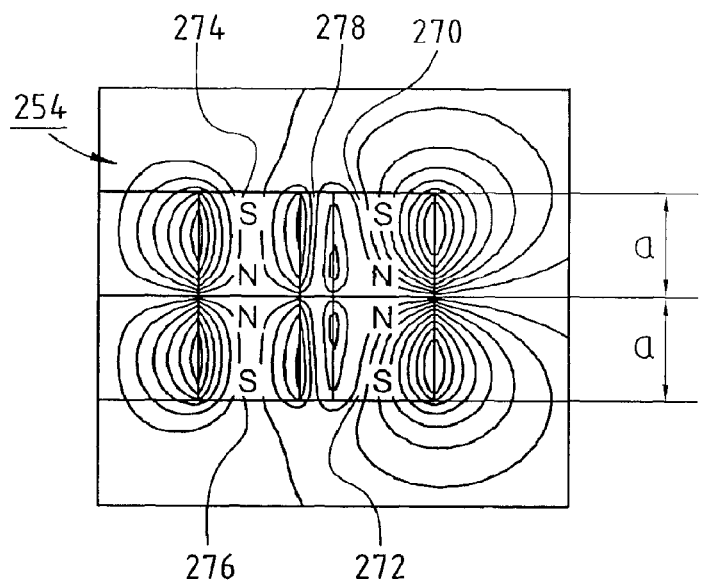
Figure 16:
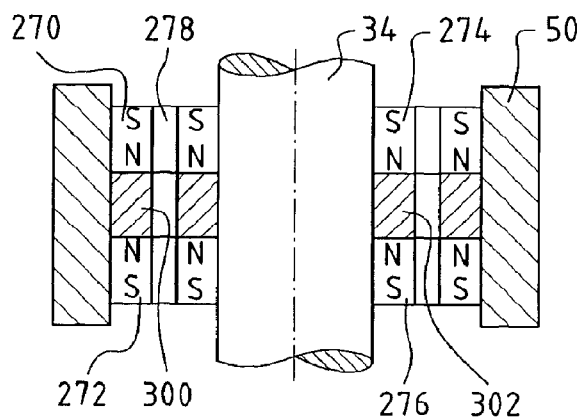
Figure 17:
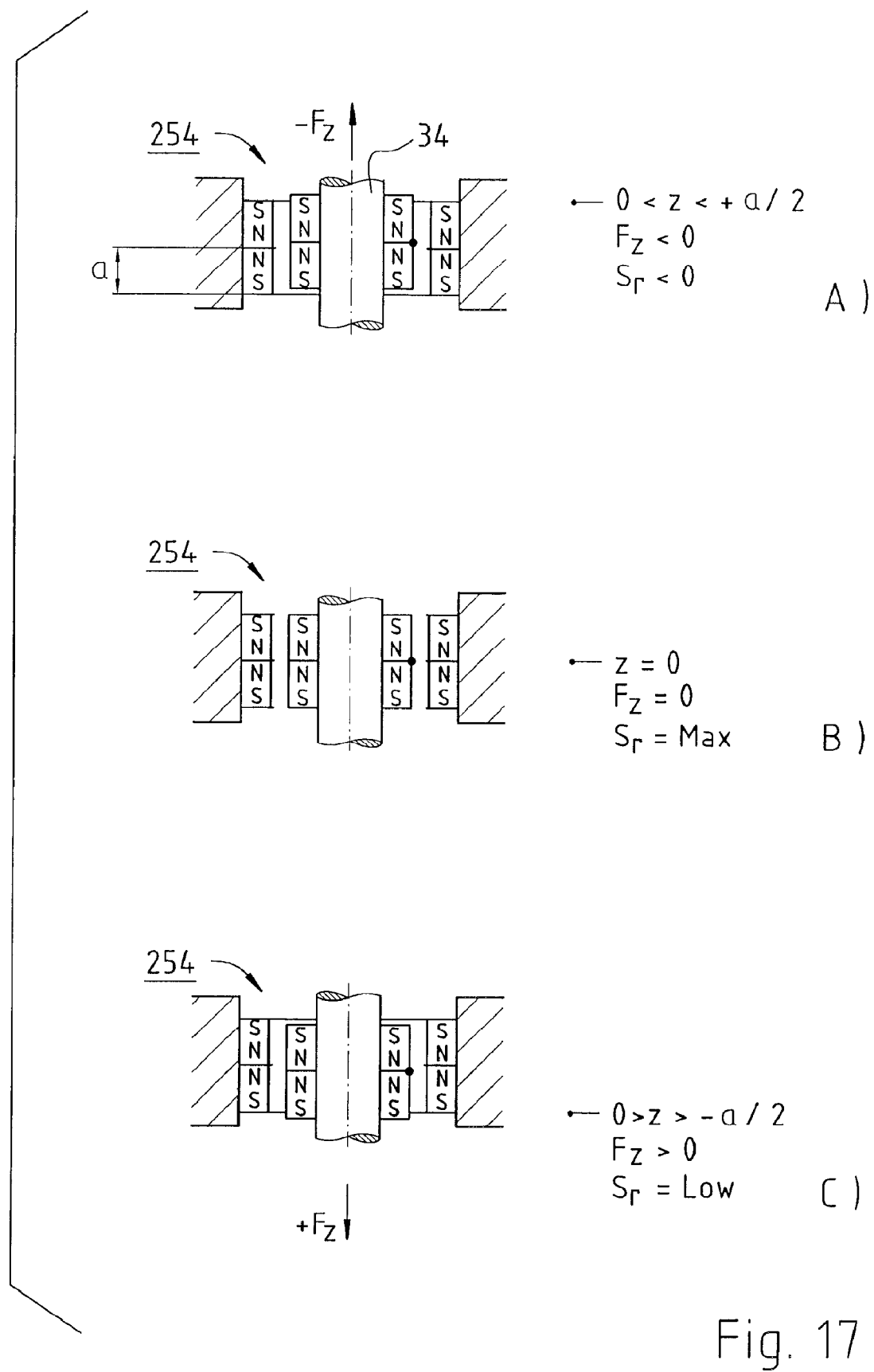
Figure 18:
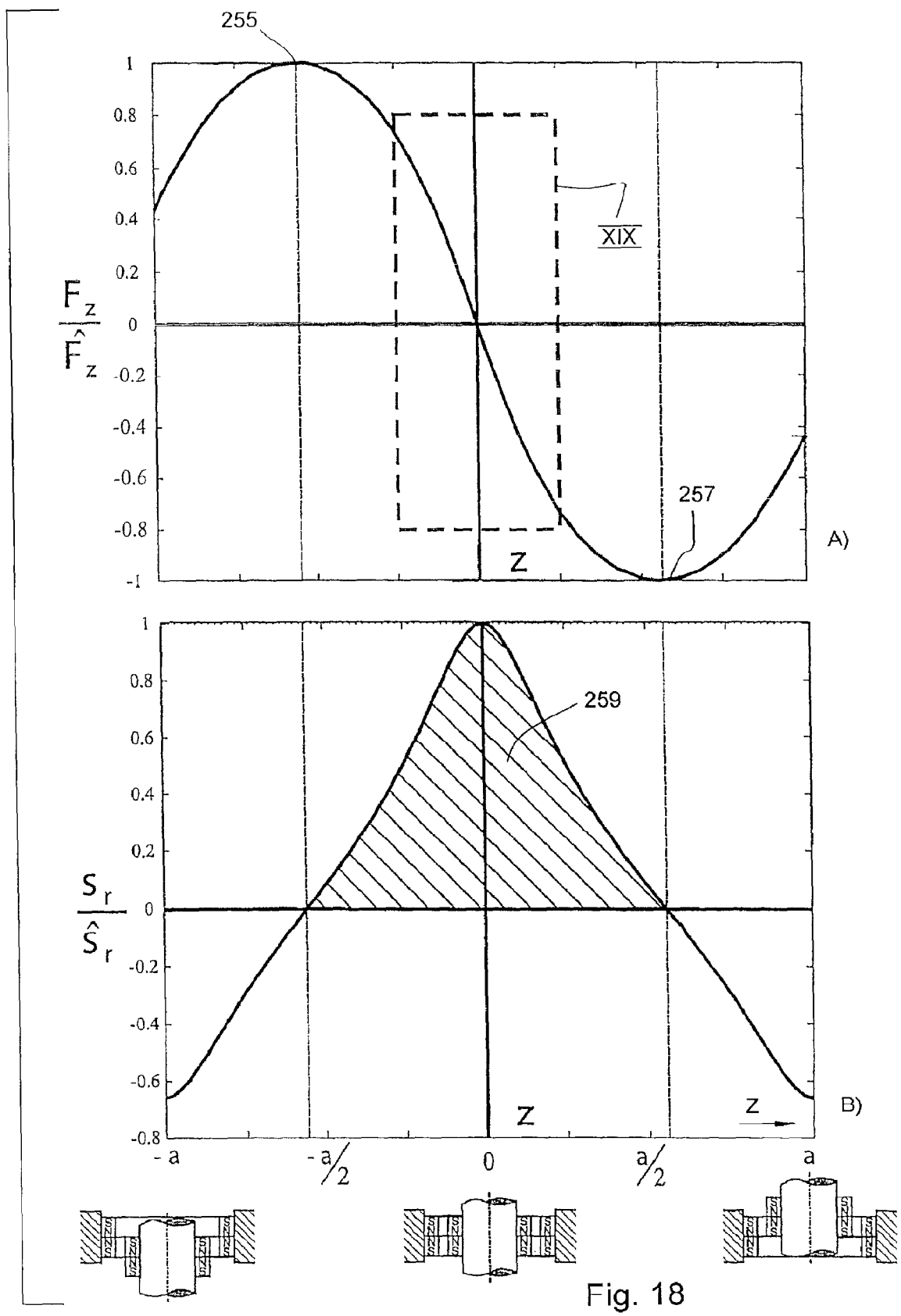
Figure 19:
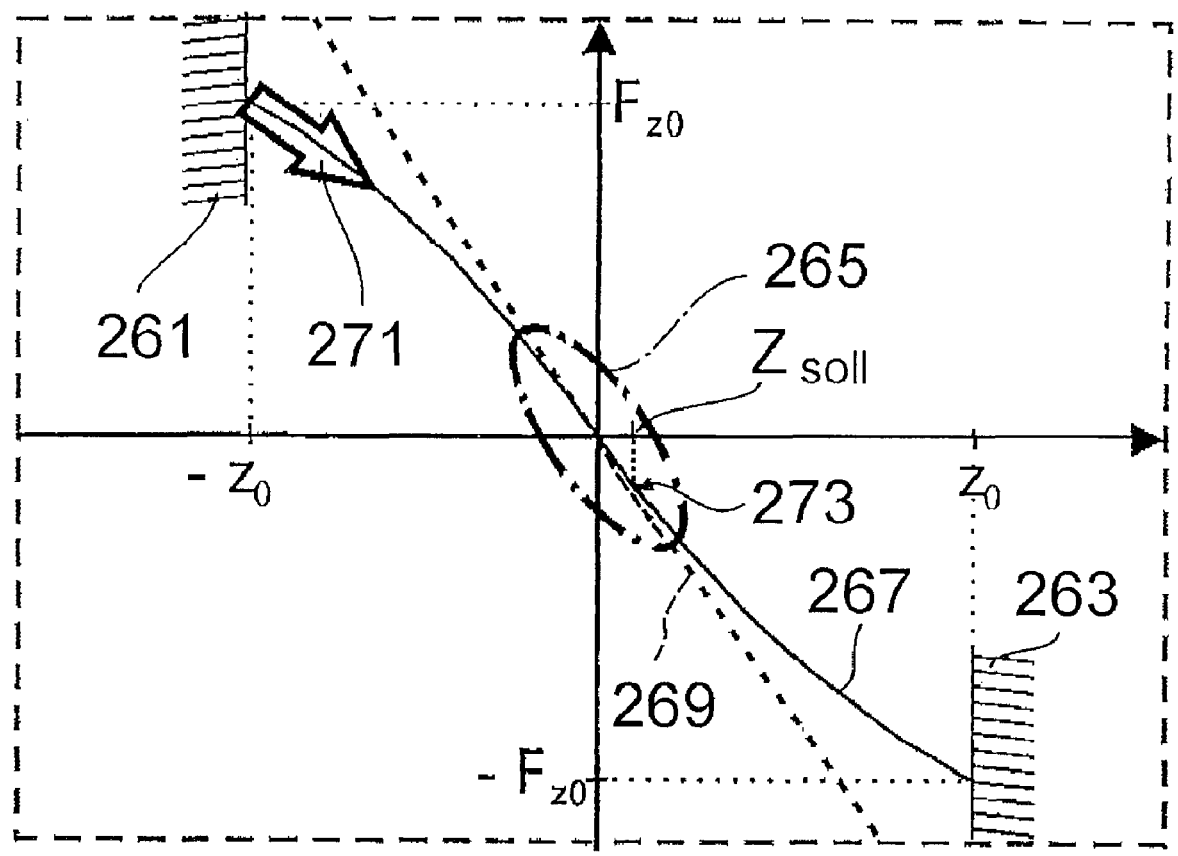
Figure 20:
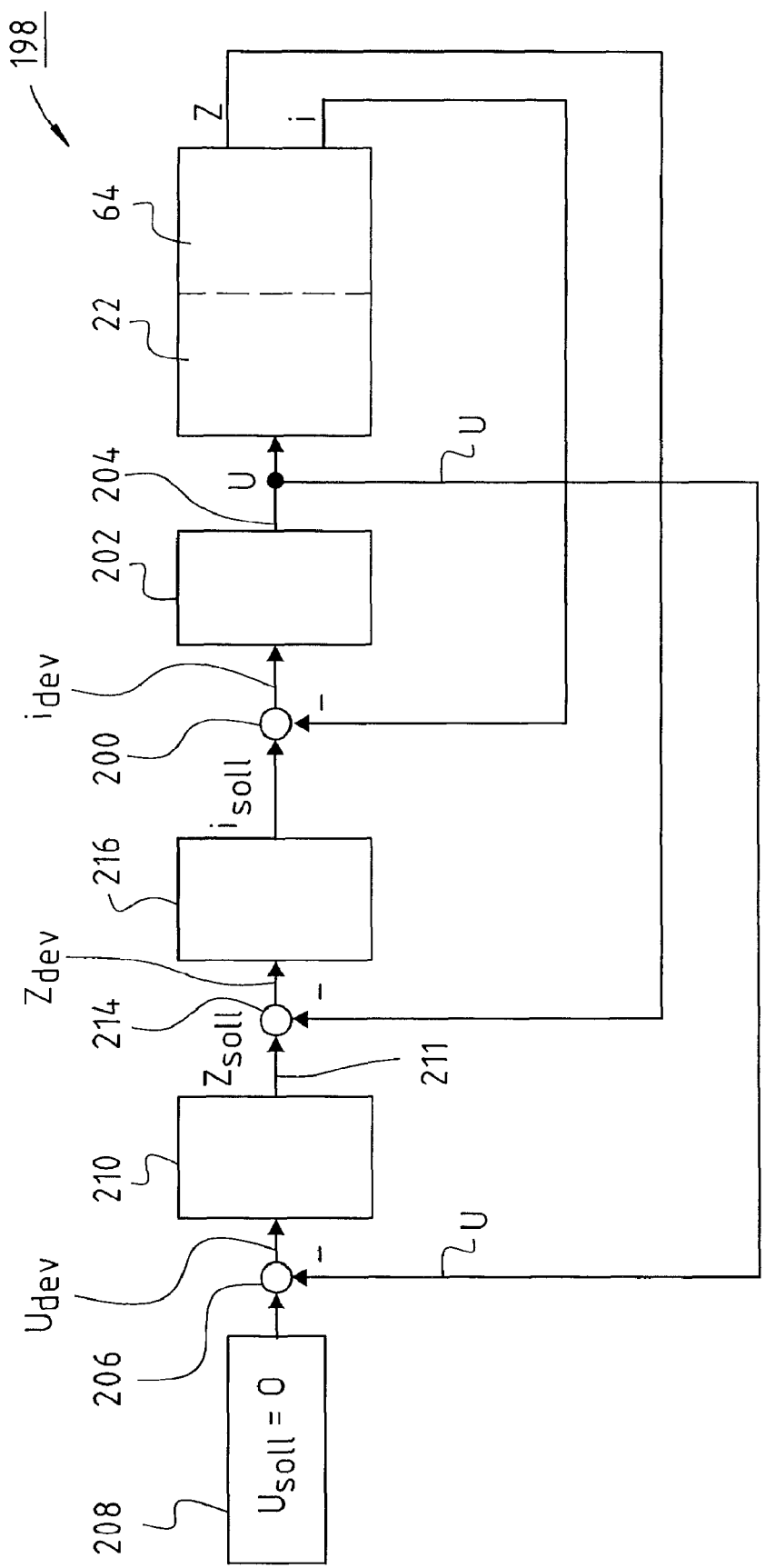
Figure 21:
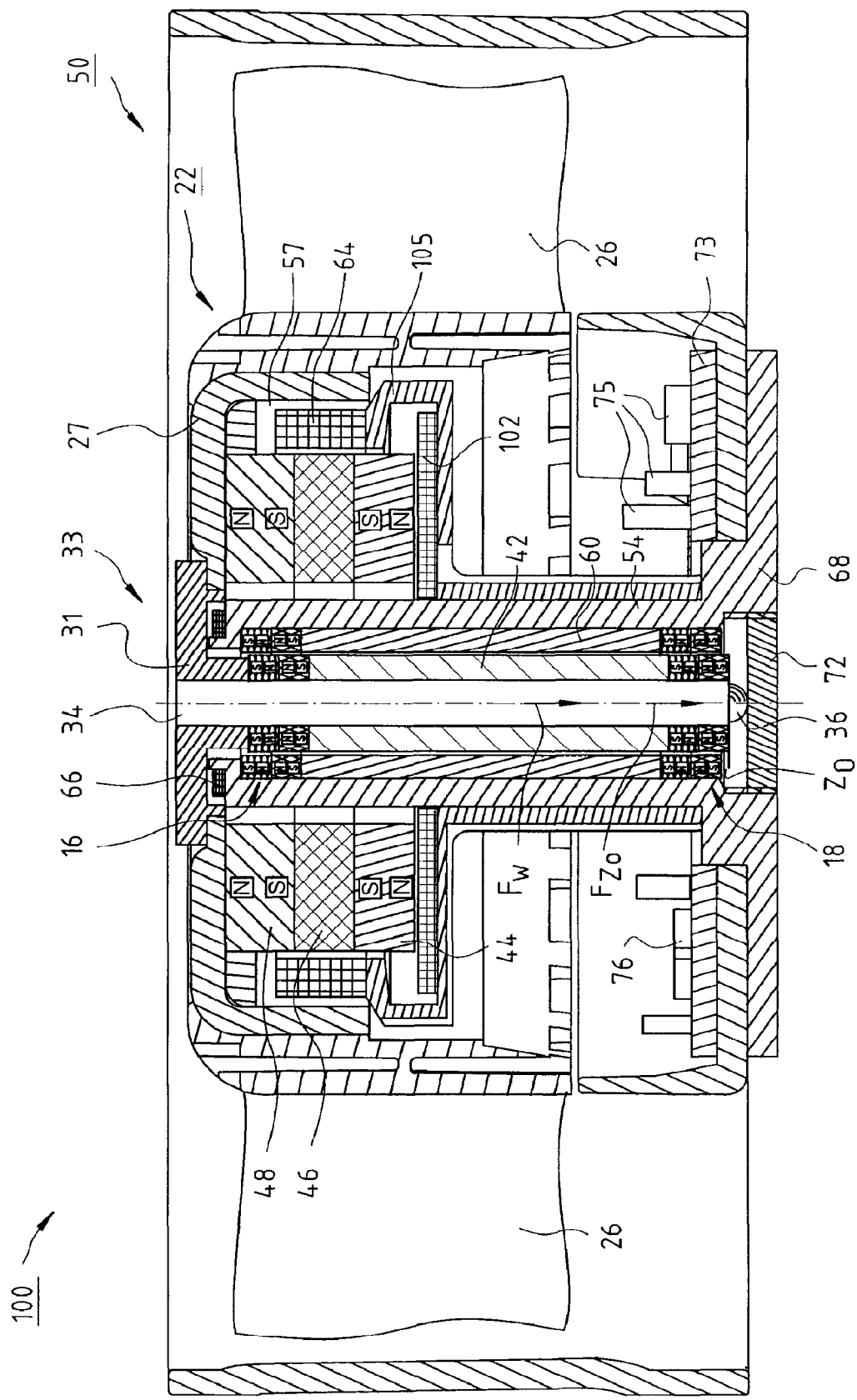
Figure 22:
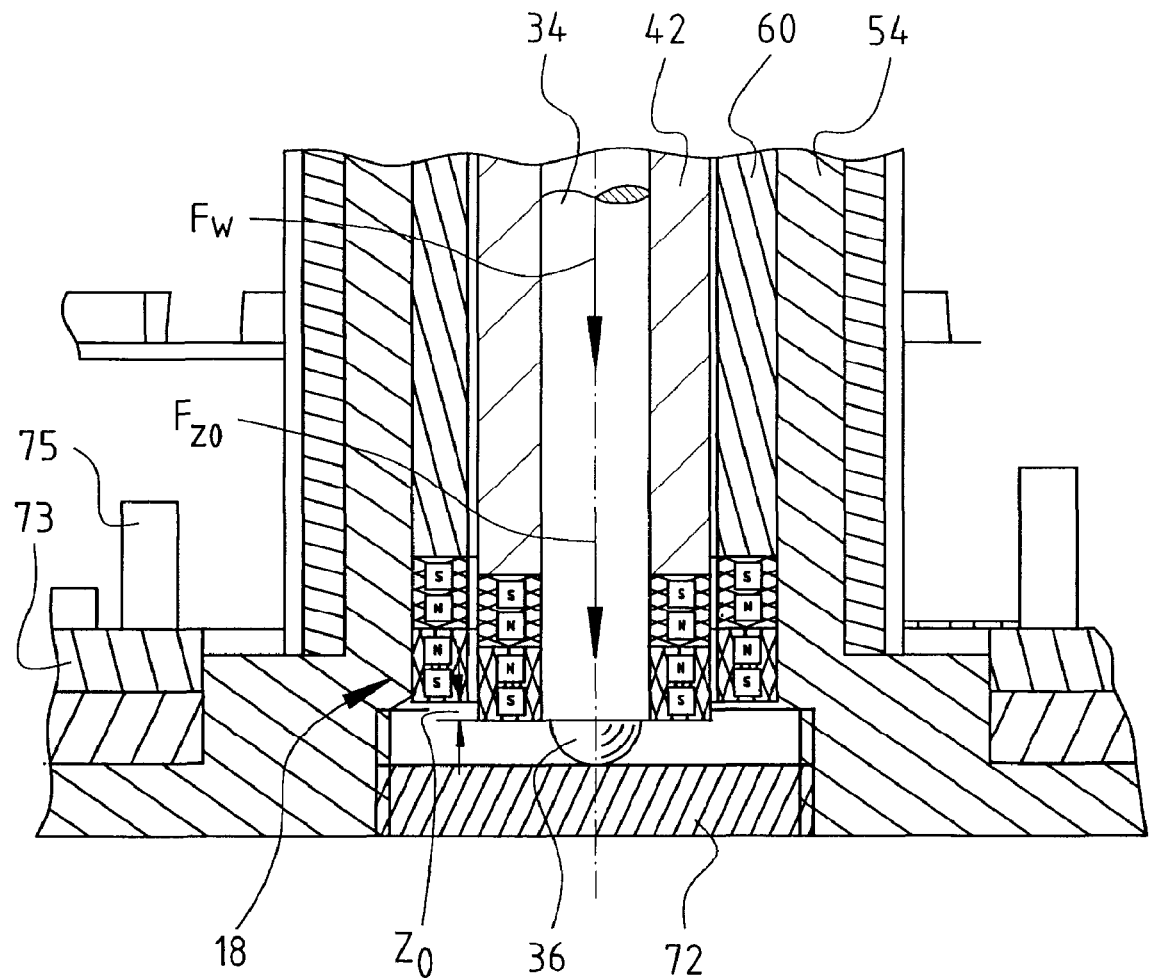
Figure 23:
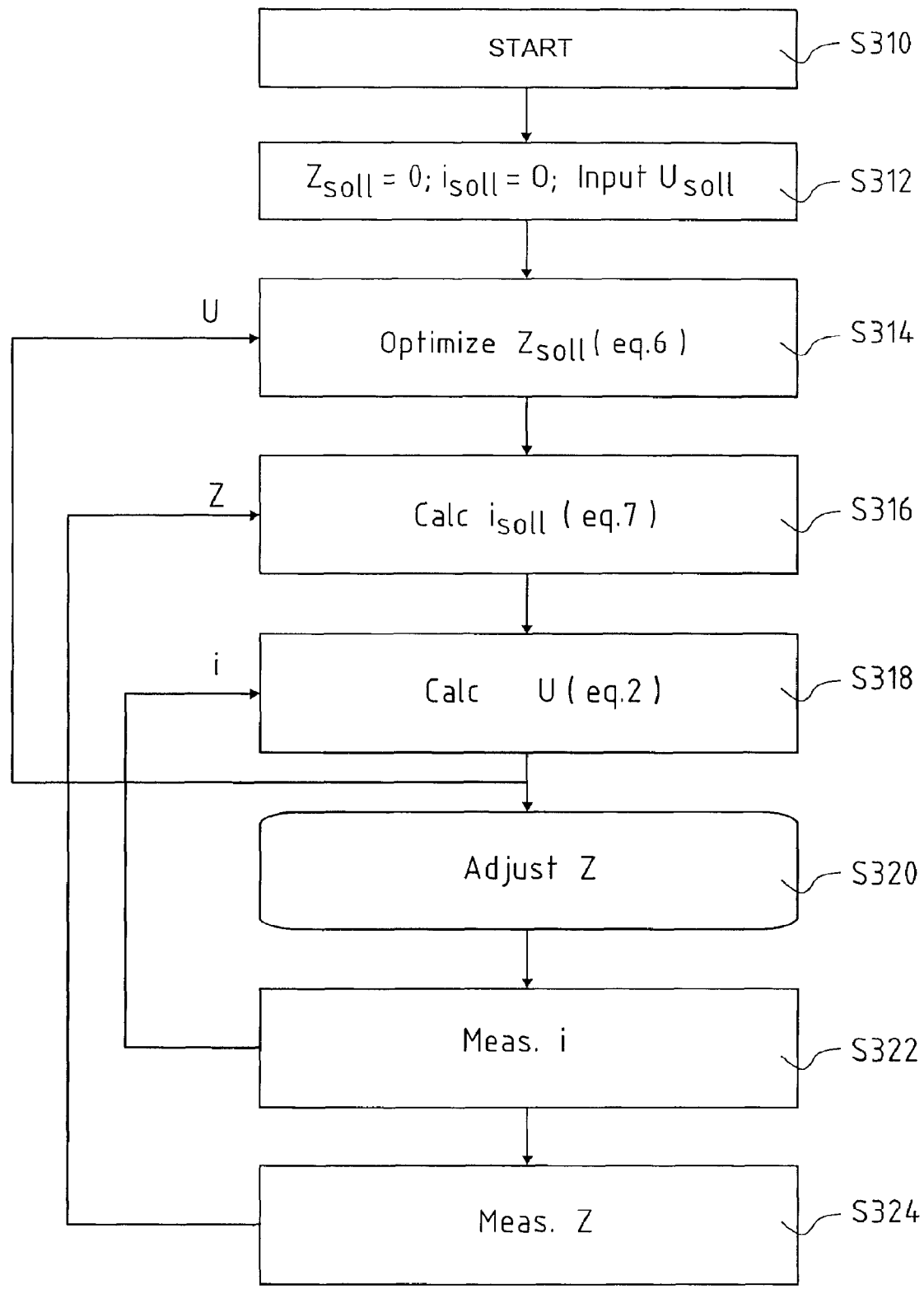
Figure 24:
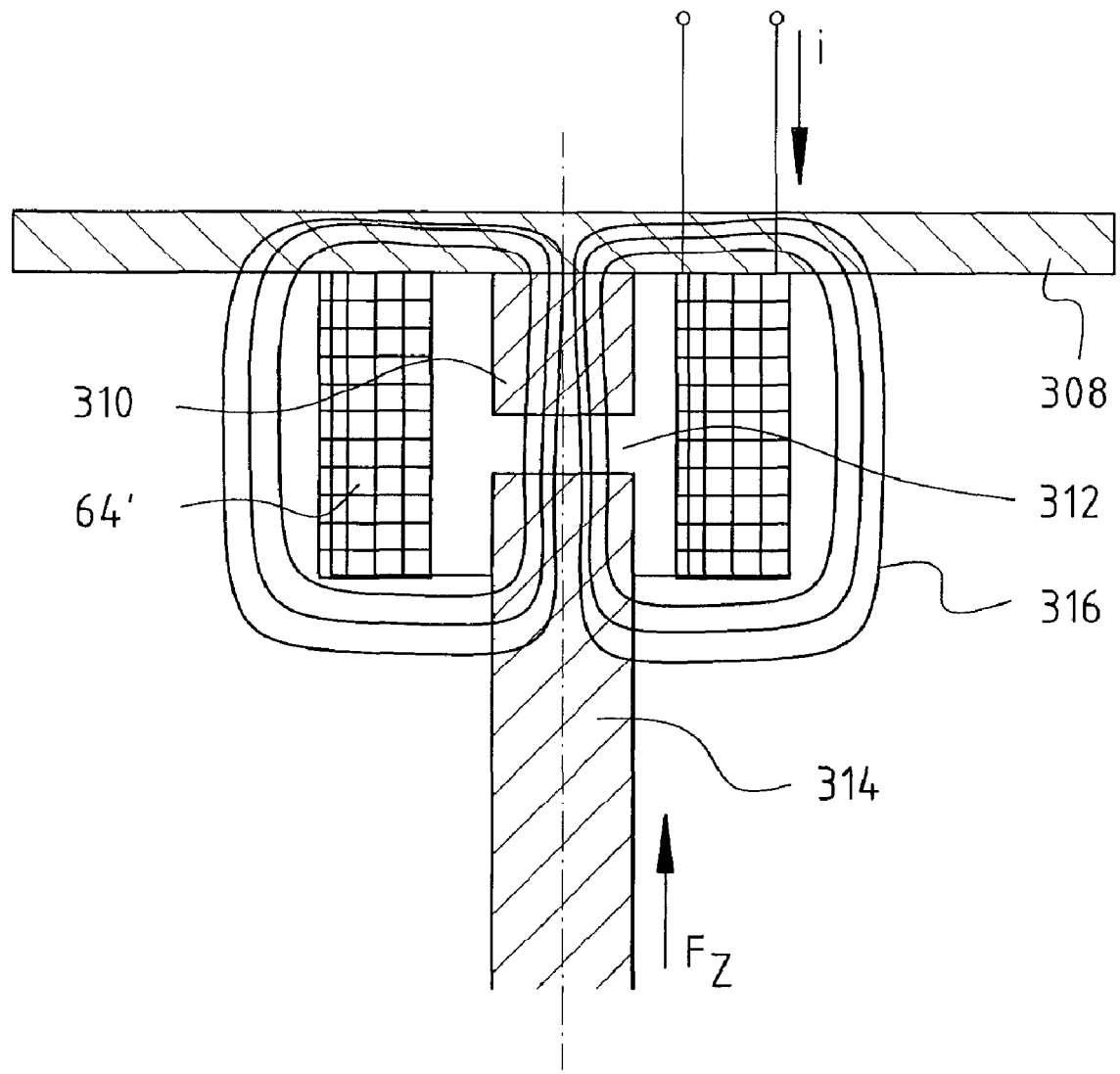
Figure 25:
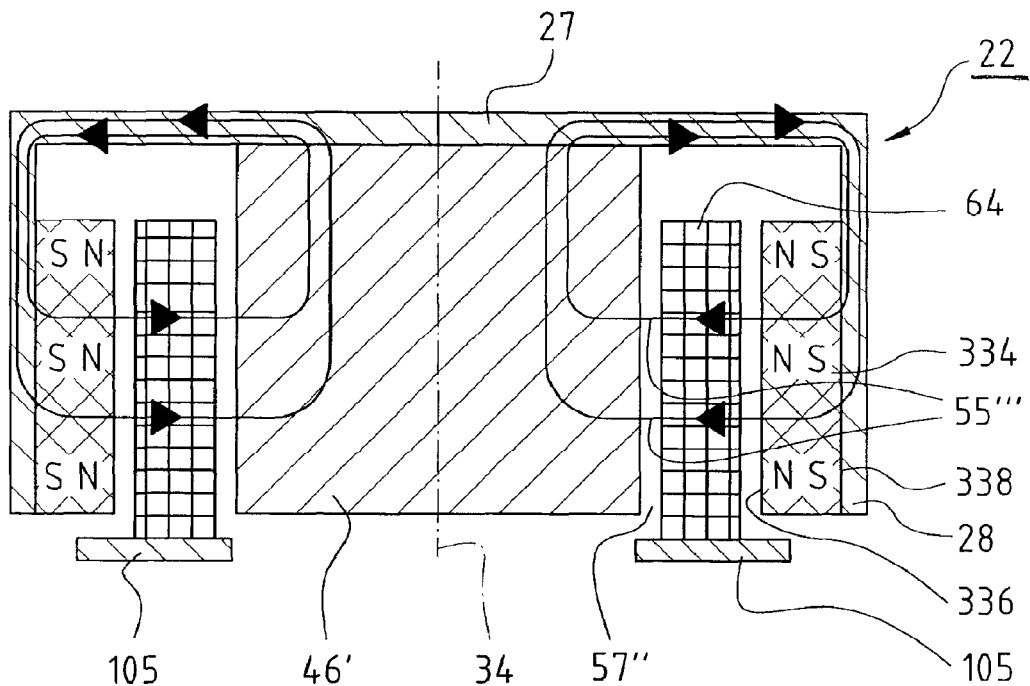

FIG. 8 schematically depicts the evaluation of the electrical signals of eddy current sensor 33;

FIG. 9 depicts the output signal of eddy current sensor 33 as a function of a distance variable d;

FIG. 10 shows a circuit that indicates how the current i in a plunger coil 64 is controlled as a function of the output signal of eddy current sensor 33 and other variables;

FIG. 11 is a depiction showing four basic designs of non-contact magnetic radial bearings;

FIG. 12 is an individual depiction of bearing design 262 of FIG. 11;

FIG. 13 depicts the field-line profile for bearing design 262 of FIGS. 11 and 12;

FIG. 14 is an individual depiction of bearing design 254 of FIG. 11;

FIG. 15 depicts the field-line profile for bearing design 254 of FIGS. 11 and 14;

FIG. 16 shows a variant of bearing design 254 of FIG. 14; this variant reduces the risk that the ring magnets of the radial bearing may demagnetize one another;

FIG. 17 depicts bearing design 254 according to FIGS. 14 and 15 in three different axial positions;

FIG. 18 is a depiction showing the axial force Fz and bearing stiffness Sr generated for bearing design 254 according to FIG. 17, for different axial positions of the bearing that are depicted at the bottom of FIG. 18;

FIG. 19 is an enlarged depiction of detail XIX of FIG. 18;

FIG. 20 depicts a preferred control arrangement 198 that can be used in the context of the fan according to FIGS. 1 to 6 in order to journal the fan in non-contact fashion and with little energy expenditure;

FIG. 21 is a depiction, analogous to FIG. 3, but in the currentless state of the fan, in which rotor shaft 34 abuts with a magnetically generated preload against a disk 72;

FIG. 22 is an enlargement of a portion of FIG. 21, showing the location of lower radial bearing 18 in the currentless state of the fan;

FIG. 23 is a flowchart which depicts a starting routine that executes, after a fan is switched on, in order to bring the non-contact bearing into an operating position;

FIG. 24 depicts a first variant that serves, during operation, to modify the axial position of the fan shaft;

FIG. 25 shows a second variant; and

Figure 26:
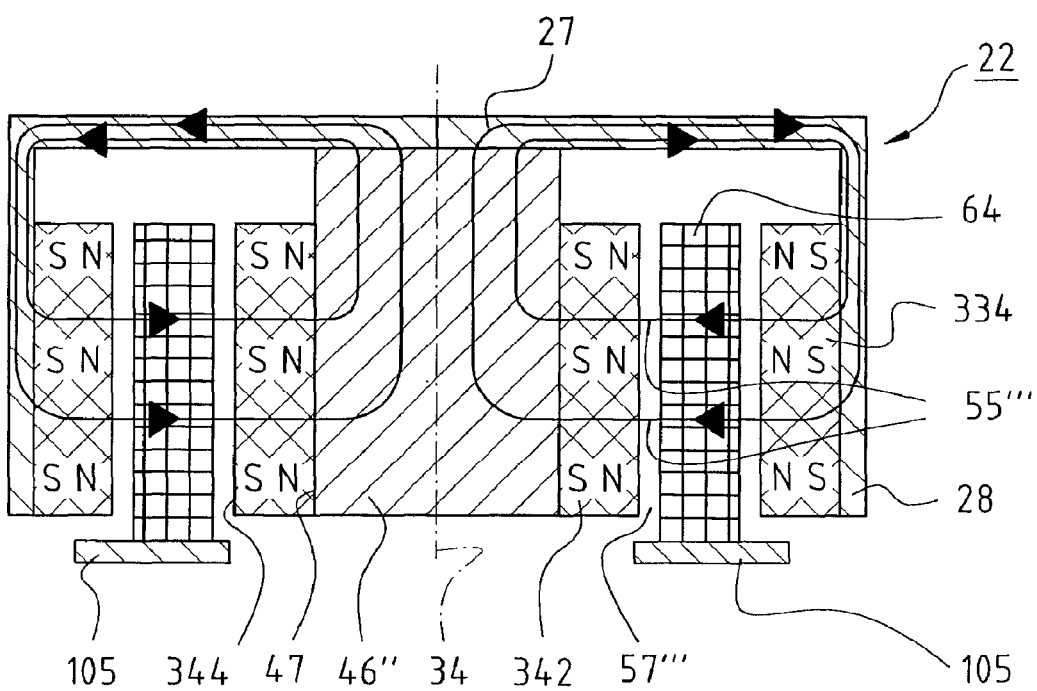

FIG. 26 shows a third variant of an arrangement for modifying the axial position of the rotor shaft.

DETAILED DESCRIPTION OF PREFERRED EMBODIMENTS

In the description that follows, identical or identically-functioning parts are labeled with the same reference characters, and are usually described only once. Spatial terms such as "upper," "lower," "left," "right" refer to the respective Figure.

Figure 1:
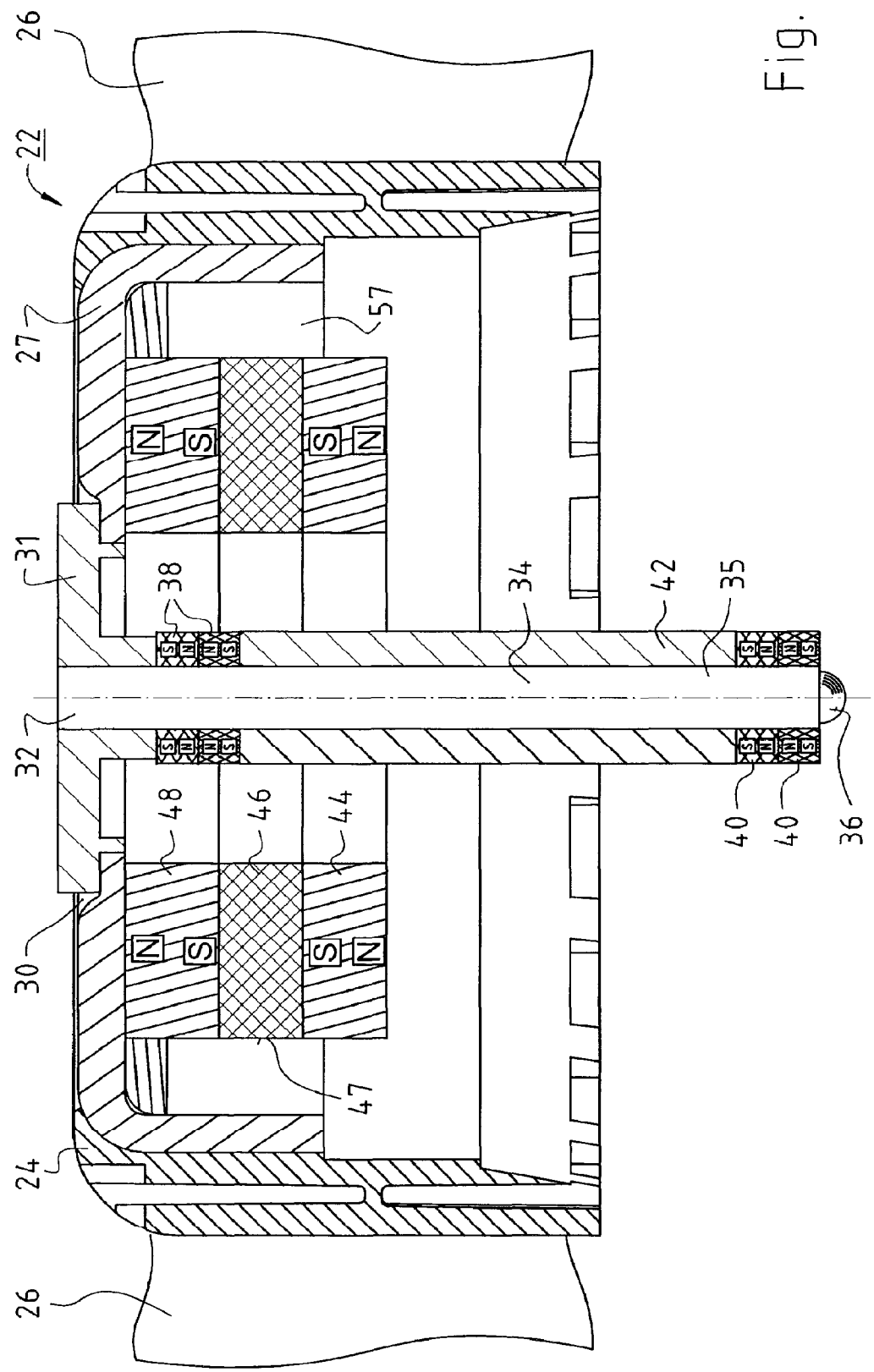

FIG. 1 shows rotor 22 of a fan 100. Rotor 22 has a rotor cup 24 having a base 30 in which an upper shaft end 32 of a rotor shaft 34 is mounted in an aluminum hub 31. The lower end of rotor shaft 34 is labeled 35. Aluminum hub 31 belongs to an eddy current sensor 33 (FIG. 7, FIG. 8) to which a sensor coil 66 (FIG. 2) also belongs. It is supplied with a high-frequency current 230 and consequently generates a high-frequency magnetic field, e.g. at a frequency of 1 MHz. Although theoretically a frequency in the range between 10 KHZ and 100 MHz could be used, the former frequency would make the controller response undesirably slow, and the latter frequency would make parasitic capacitance a problem. Upon a change in distance d (FIG. 7) between coil 66 and aluminum hub 31, the electromagnetic damping of coil 66 changes, and this can be sensed as an electrical signal $U_m$ (FIG. 9). This signal represents an indication of distance d between sensor coil 66 and hub 31. It can be compared with a reference value Zsoll (FIG. 20, comparator 214). This position signal, there called Z, is controlled by means of a position controller 216 (FIG. 20) to an optimized target value $Z_{soll}$ in order to hold rotor 22 in an optimum axial position or upward displacement relative to stator 50. This is described below.

Lower end 35 of shaft 34 is configured in approximately dome-shaped fashion and serves, in coaction with a disk or part 72, in an emergency or after shutdown of bearing 100, as a mechanical axial bearing or a so-called "touchdown" bearing.

For passive radial journaling of shaft 34, two passive magnetic radial bearings 16 (FIG. 3, top) and 18 (FIG. 3, bottom) are provided, which in the exemplifying embodiment are configured identically. Upper radial bearing 18 has two ring magnets 38 at upper end 32 of shaft 34 and, located approximately opposite them, two stationary ring magnets 56 in a bearing tube 54 (cf. FIG. 2). Lower radial bearing 18 has two ring magnets 40 at lower end 35 of shaft 34 and, located approximately opposite them, two stationary ring magnets 58 in a bearing tube 54 (cf. FIG. 2). All these rings are magnetized in an axial direction and are made of a permanently magnetic material, e.g. SmCo or NdFeB, such as the rare-earth alloy magnets available from Magnetfabrik Schramberg of Schramberg, Germany. Ring magnets 38 and 40 are held at a defined distance from one another by a spacing element or sleeve 42. Ring magnets 56 and 58 are likewise held at that defined distance from one another by a spacing sleeve 60 (FIG. 2).

With this type of repulsive radial bearing 16, 18, as described in complete detail with reference to FIG. 11, FIG. 14, FIG. 17, FIG. 18, and FIG. 19 and labeled therein as 254, spacing sleeves 42 and 60 should have exactly the same length and preferably should be electrically conductive, e.g. made of aluminum. They should be, at most, weakly ferromagnetic.

Figure 2:
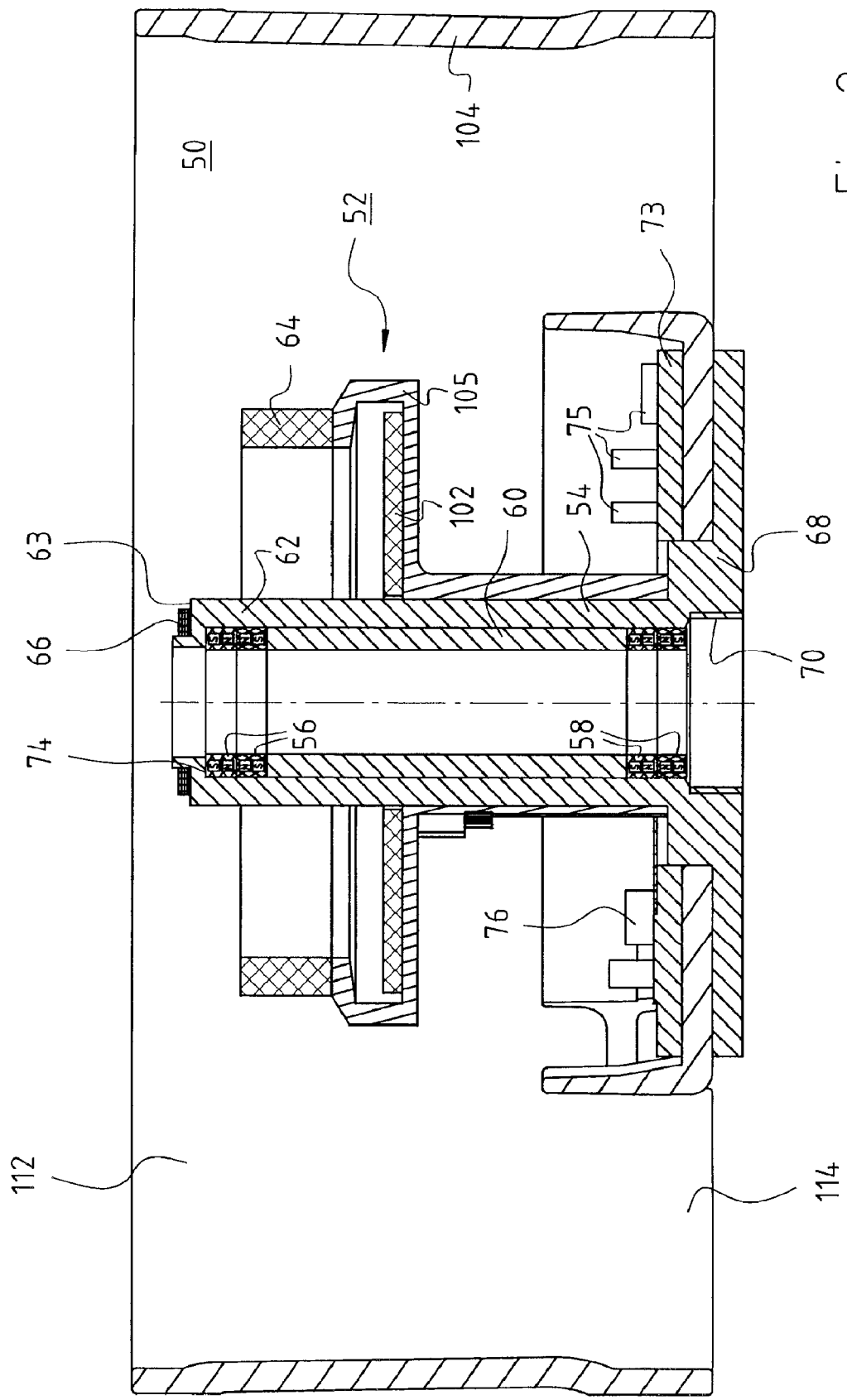
FIG. 2 is a longitudinal section through the stator belonging to FIG. 1, including a plunger coil 64, arranged on said stator, that is a constituent of an actively controllable magnetic axial bearing.

FIG. 2 is a longitudinal section through a fan housing 51 and through stator 50 of a disk armature motor 52 that serves to drive fan 100. (An internal- or external-rotor motor, for example, can also be used instead of a disk armature motor 52.) Housing 51 is preferably configured integrally with bearing tube 54, in whose interior (in this exemplifying embodiment) the two upper ring magnets 56 and the two lower ring magnets 58 are located. Spacing members 42, 60 are made of the same material and have an identical length.

They are selected so as to guarantee the greatest possible distance between upper ring magnets 38, 56 on the one hand and lower ring magnets 40, 58 on the other hand. The result, as is known per se, is to enhance the tilting rigidity of the radial bearing arrangement constituted by these ring magnets. Spacing members 42, 60 also ensure that when upper radial bearing 16 is in its zero-axial-force center position, the same is also true of lower radial bearing 18. (On the subject of axial forces, cf. the statements with regard to FIG. 6.)

Uppermost ring magnet 56 abuts with its upper end 62 against a shoulder 74 (FIG. 2) of bearing tube 54. Serving to support the lower end of bottommost ring magnet 58 is a contact washer or disk 72 (FIG. 3) that is secured in an opening 70 of bearing tube 54. The ring magnets can be secured, for example, by adhesive bonding.

In this exemplifying embodiment, disk armature motor 52 is mounted on the outer side of bearing tube 54. It has a flat (planar) air gap 101 that is delimited at the top by the underside 107 of a rotor magnet 44. According to FIG. 5, rotor magnet 44 can have four poles. Motor 52 has a so-called air-core stator 102 that, in the exemplifying embodiment, has four sector-shaped air-core coils 103 (FIG. 5) that are arranged in a supporting part 105 made of plastic. A magnetic yoke 109, made of a soft-ferromagnetic material and drawn with dashed lines in FIG. 3, can be provided below supporting part 105. It is optimum if this yoke 109 rotates together with rotor magnet 44. A soft-iron ring 46 serves as a magnetic yoke for rotor magnet 44, and furthermore serves as a flux-conducting member for an actively controllable non-contact axial bearing.

Fan 100 encompasses a circuit board 73 on which electronic components 75 are arranged, including a digital signal processor (DSP) 76 that both control the axial position of rotor 22 relative to stator 50 and controls commutation of the currents in electronically commutated motor 52 (cf. FIG. 10). In the preferred embodiment, DSP 76 is a model dsPIC33 digital signal controller from Microchip Technology, Inc. of Chandler, Ariz. but it will be apparent to those skilled in the art that alternative chips are commercially available. Mounted on the upper side of supporting part 105 is a plunger coil 64 that extends into a cylindrical air gap 57 (FIG. 3) and serves to stabilize the location of rotor 22 relative to bearing tube 54 in an optimized position. This is not a fixed position, but rather a position Zsoll that is based on the forces acting in the axial direction on shaft 34 during operation. This is explained below with reference to FIG. 20.

Sensor coil 66 of eddy current sensor 33 is arranged on the end face of a shoulder 63 (FIG. 2) at upper end 62 of bearing tube 54. At lower end region 68, bearing tube 54 has an opening 70 in which contact washer 72 (FIG. 3) is secured, for example by being screwed in. During normal operation of fan 100, shaft 34 levitates freely, i.e. without touching contact washer 72. At a standstill, and in a context of large axial interference forces, contact washer 72 serves as a so-called "touchdown" bearing, i.e. shaft 34 then abuts with its dome 36 against washer 72 (cf. FIG. 21), thus also providing emergency running properties. A touchdown bearing of this kind can also be provided in the same fashion at the upper end of bearing tube 54. It is also possible to provide at least one radial touchdown bearing, in which the mechanical gap of the radial plain bearing is smaller than the gap of the adjacent magnetic radial bearing 16 or 18. The result of this is that, if rotor 22 should happen to tilt, the radial touchdown bearing is the first to be mechanically stressed. Radial magnetic bearings 16, 18 therefore remain undamaged in such a case.

Semispherical end 36 of shaft 34 is preferably configured as a smooth, rounded end that, together with contact washer 72, forms an axial bearing that is also referred to as a thrust bearing. The radial touchdown bearing is not depicted.

A thin (preferably 0.2- to 0.3-mm) layer of a plastic having a low coefficient of friction (e.g. PTFE =polytetrafluoroethylene) is advantageously inserted between semispherical end 36 and contact washer 72 so that upon startup and rundown and in emergency cases, semispherical end 36 constitutes an emergency bearing with said thin layer.

FIG. 3 is a longitudinal section through the entire structure of a fan 100 that is driven by disk armature motor 52. In FIG. 3, rotor 22 has no contact point with stator 50 during operation. Instead, rotor 22 is journaled in non-contact fashion in the radial direction by the passive radial bearings 16, 18. Axially, it is journaled in non-contact fashion by the actively controllable axial bearing 57, 64 and by the axial force Fz (FIG. 6; FIG. 18) generated by the two radial bearings 16, 18.

The components of the active axial bearing are an axially magnetized ring magnet 48, a soft-ferromagnetic ring 46, a second magnetic yoke 27 on rotor 22, cylindrical air gap 57, and the air-core plunger coil 64 on supporting part 105, i.e. on stator 50.

Located on the outer periphery of rotor 22, whose rotor cup 24 is made partly of plastic and has magnetic yoke 27 embedded in it, are fan blades 26 that, during operation, exert an axial force on rotor 22 upward or downward with reference to FIG. 1 depending on the rotation direction. These blades 26 damp the motions of rotor 22, which proves to be very advantageous for the necessary control operations and makes those operations highly stable.

Rotor 22 with its rotor shaft 34, and ring magnets 38, 40 secured on said shaft, are positioned in housing 51 in such a way that when motor 52 is running, ring magnets 56, 58 and ring magnets 38, 40 are located approximately opposite each other but are very slightly offset from one another in most operating conditions. Relatively seldom, however, operating states can also occur in which such an offset does not occur.

Figure 4:
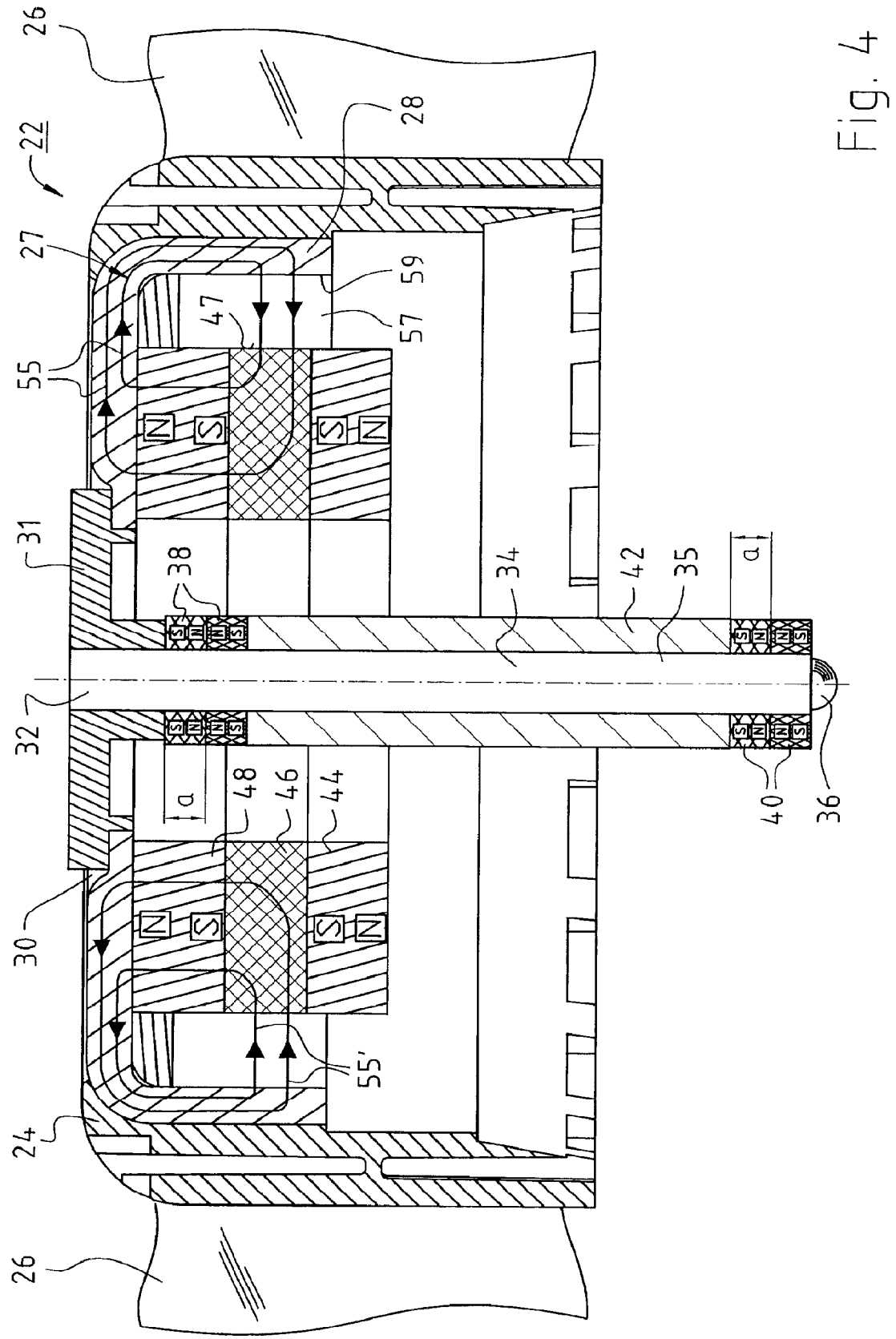
FIG. 4 shows the profile of the magnetic flux in the rotor of FIG. 1 that is used in the active magnetic axial bearing in this embodiment.

FIG. 4 shows, in a simplified depiction, the profile of magnetic flux lines 55 which symbolize the flux generated by the axially magnetized ring magnet 48. This flux proceeds in an approximately radial direction through cylindrical air gap 57, which extends between inner side 59 of yoke 27 and outer side 47 of soft-iron ring 46. Flux 55' in air gap 57 proceeds in a radial direction and is largely homogeneous because of the manner in which the magnetic circuit is configured. Plunger coil 64 is located, as depicted in FIG. 3, in the region of this homogeneous air-gap flux 55'. When current flows in plunger coil 64, the latter generates an axial force on rotor 22. The direction of this force depends on the direction of current i in plunger coil 64. This enables rotor 22 to be held in a desired axial position, so that it does not require a mechanical axial bearing during operation.

The location of ring magnet 48 for generating flux 55 can also be selected differently, e.g. on inner side 59 of edge portion 28 of second yoke part 27 (cf. the arrangements according to FIGS. 25 and 26). Ring magnet 48 is of course particularly easy to fabricate and install.

Figure 5:
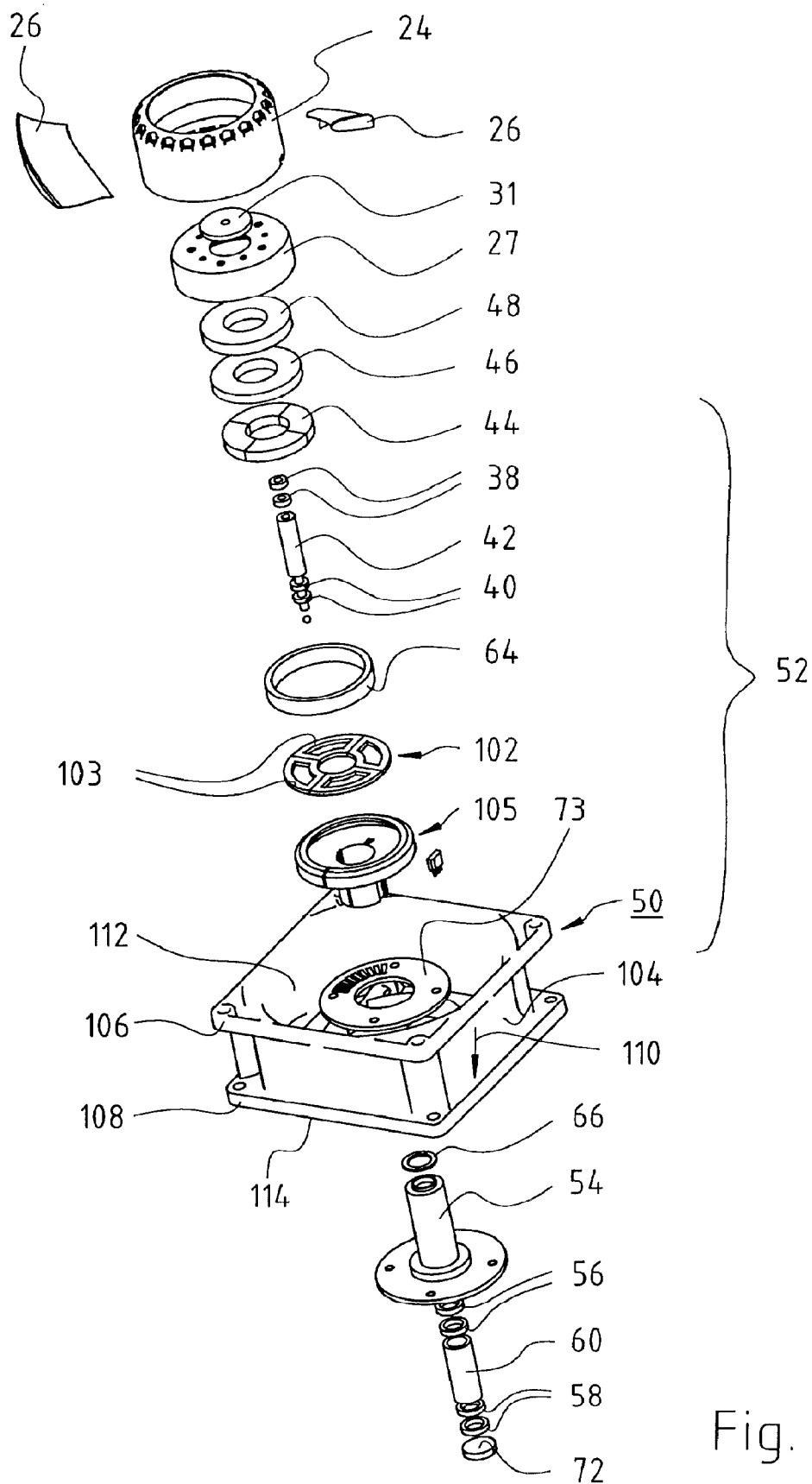
FIG. 5 is an exploded view of the fan of FIG. 3.

FIG. 5 shows the structure of fan 100 in an exploded view. Fan 100 has a fan housing 51 that has approximately the shape of a tube 104, on both of whose ends mounting flanges 106, 108 are provided in the usual manner. The air flow direction is indicated at 110. The inflow side of fan 100 is labeled 112, and its outflow side 114. Motor 52 drives a fan wheel 25. Located on the latter are fan blades 26, only two of which are schematically depicted.

The shape of blades 26 is adapted to the conical shape of the inner side of tube 104. Fan wheel 25 is preferably configured in frustoconical fashion on its outer side, and together with tube 104 of fan housing 51 forms an air passthrough aperture. The latter preferably has a smaller diameter on air entrance side 112 than on air exit side 114. Fan wheel 25 likewise has a smaller diameter on air entrance side 112, which diameter increases toward air exit side 114. The above-described construction of fan 100 is of course equally suitable for a usual axial fan, a diagonal fan, or a radial fan, since the type of journaling is suitable for all fan types and also for other devices having similar properties, especially because fan blades 26 constitute a natural damping system for rotor 22.

Figure 6:
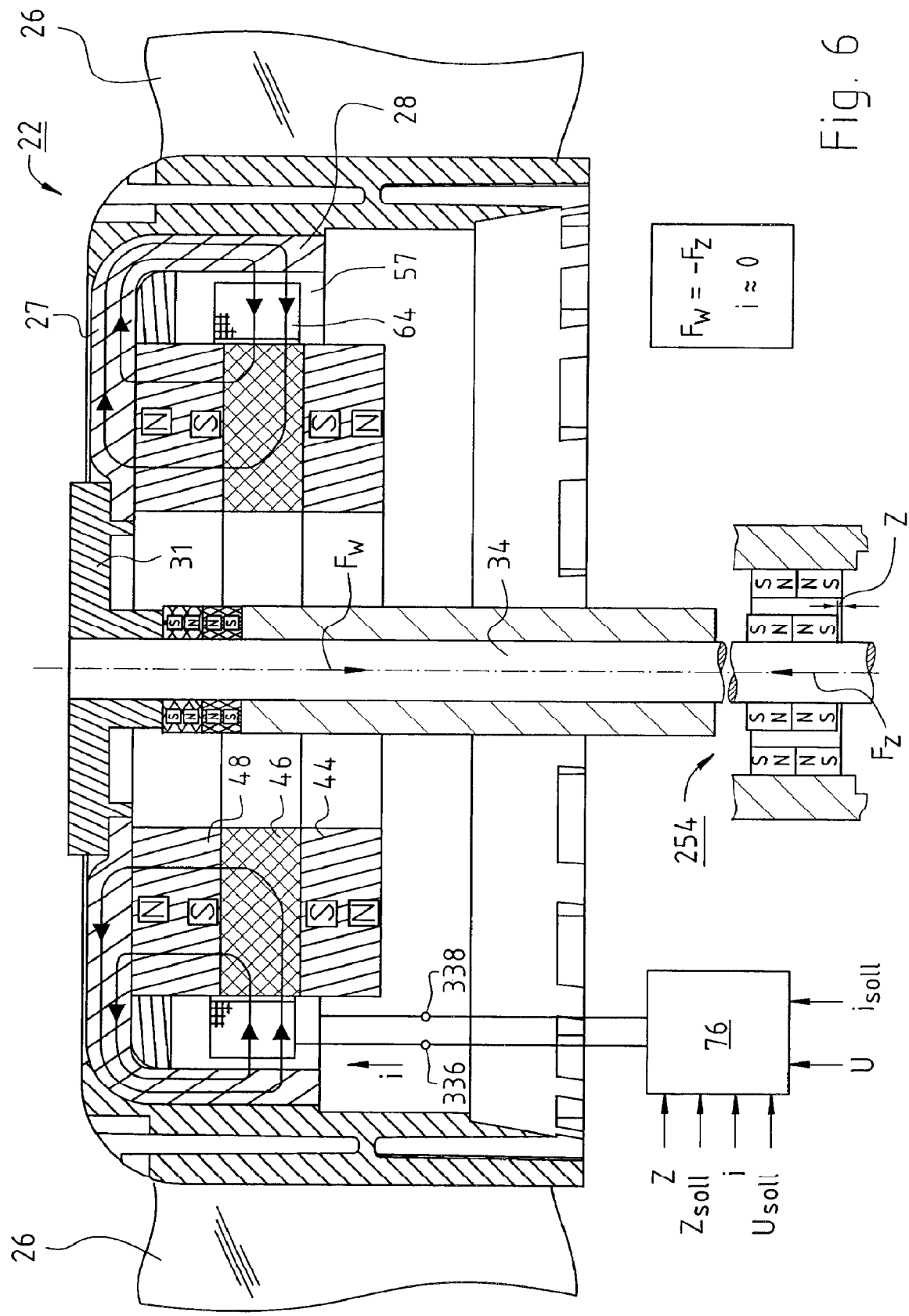
FIG. 6 is a depiction analogous to FIG. 4, showing, in a highly schematic depiction, the manner of operation of a fan according to a preferred exemplifying embodiment of the invention.

FIG. 6 shows the working principle of the optimized axial bearing system in a highly simplified and schematic depiction. Various values are delivered to DSP 76, namely true position Z, which is measured with the aid of eddy current sensor 33 (not depicted in FIG. 6); target position Zsoll (which is calculated internally in DSP 76 but is depicted as an external signal for illustrative purposes); the actual current i in plunger coil 64, which current is measured indirectly by means of a current sensor 339 depicted in FIG. 10 and can be positive or negative; target voltage Usoll=0 specified by sensor 208 (FIG. 20); actual voltage U (which is likewise calculated internally in DSP 76 but is shown as an external value); and target current isoll for subordinate current controller 202 (FIG. 20), which current isoll is likewise calculated internally in DSP 76.

Two principal forces are acting here: on the one hand a force Fw that, in the case of a vertical rotor axis 34, is caused by the dead weight of rotor 22 and acts downward; and a bearing force Fz generated by the two radial bearings 16, 18, which acts upward and whose magnitude depends on the axial displacement Z between the inner ring magnets (FIG. 14: 274, 276) and the outer ring magnets (FIG. 14: 270, 272).

FIG. 6 depicts, instead of the two radial bearings 16, 18 that are actually present, only a single radial bearing 254 whose force Fz is twice as great as the axial force of one of radial bearings 16, 18. This is done in order to make the depiction more understandable.

Under the control of DSP 76, a current is delivered to plunger coil 64 until rotor 22 is in a position in which $$Fw-Fz=0 \qquad (1)$$

This position Z must be constantly readjusted by DSP 76 because it is unstable, but only small values of current i are necessary for readjustment, so that active axial position control (by air-core plunger coil 64) has only a low energy demand and does not significantly influence the efficiency of fan 100.

If FIG. 6 is turned upside down, weight force Fw of rotor 22 acts in the opposite direction, and the direction of bearing force Fz must consequently also be reversed; this is done by reversing the sign of the value Zsoll. Bearing force Fz then acts in the opposite direction.

Control arrangement 198 depicted in FIG. 20 of course compensates not only for weight force Fw (i.e. the dead weight of rotor 22) but for all the axial forces acting on rotor 22, for example the flow forces that are generated by fan blades 26, any forces resulting from vibrations acting on fan 100, and any axial forces that are generated by motor 52. It is favorable if no oscillating forces are generated by motor 52, since they would require constant correction of the position of rotor 22. It has been found in practice that if controller 198 is well designed, variable Z can be kept constant to within approximately 1 (mu)m, so that fan 100 runs very quietly. The damping produced by fan blades 26 also contributes to this.

Figure 7:
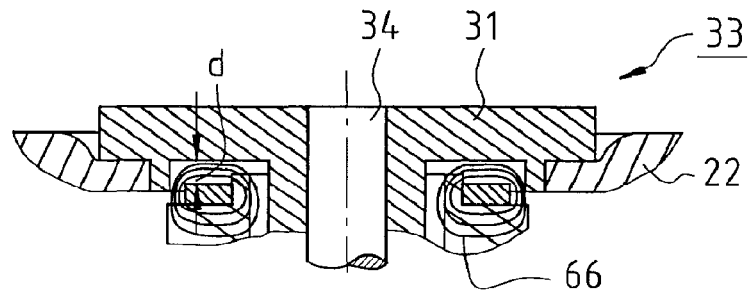
FIG. 7 depicts the general construction of an eddy current sensor 33 that may be used in an embodiment of the invention.

FIG. 7 schematically shows the construction of eddy current sensor 33. Located in this is coil 66, which according to FIG. 9 is supplied with a high-frequency current 230 from an oscillator (not depicted). Located in parallel with coil 66 is a capacitor 232 that can be selected so that it forms, together with coil 66, an oscillator circuit 234 that is in resonance with the frequency of signal 230 or operates on a side arm of its resonance curve.

Voltage 236 at this oscillator circuit 234 is a function of distance d (FIG. 7) between coil 66 and hub 31. The reason is that hub 31 damps oscillator circuit 234 more strongly as distance d decreases. Hub 31 is made of aluminum or another highly conductive metal, e.g. copper.

Voltage 236 is rectified in a rectifier 238 and then amplified in an amplifier 240, yielding at the output of amplifier 240 a measured voltage Um that is depicted schematically in FIG. 9 as a function of distance d. This analog voltage is delivered to an input ADC of DSP 76, and converted there into a digital value that is labeled Z in FIG. 20 and is further processed in digital control arrangement 198 in order to keep rotor 22 in a levitated state.

FIG. 10 shows how current i through plunger coil 64 is controlled of DSP 76.

DSP 76 on the one hand controls the commutation of electronically commutated motor (ECM) 52, which as usual is connected to a DC power network and whose commutation and, if applicable, rotation speed control are controlled by DSP 76; this is indicated by a bidirectional bus 320 over which the rotor position signals also flow from ECM 52 to DSP 76 and are processed there in order to control the commutation of motor 52 and, if applicable, control its rotation speed.

DSP 76 furthermore controls, via a bus 322, the commutation in an H-bridge 324 that has, for example, two npn MOSFETs 328, 330 at the bottom and two pnp MOSFETs 332, 334 at the top. Located on the diagonal of this H-bridge 324, between a nodal point 336 (between transistors 328 and 332) and a nodal point 338 (between transistors 330 and 334), is plunger coil 64. When the two transistors 330 and 332 are made conductive by DSP 76, current i flows from node 336 to node 338; and when transistors 328 and 334 are made conductive by DSP 76, current i flows from point 338 to point 336. The level of current i is measured at a measuring resistor 339 located between ground 340 and lower transistors 328 and 330, and the level of current i can be controlled by a change in the pulse duty factor of PWM signals that are delivered via bus 322 to H-bridge 324. The direction of the measured current i is determined by whether transistors 330, 332 or transistors 328, 334 are conductive.

When current i in plunger coil 64 flows from node 336 to node 338, the Lorentz force generated by plunger coil 64 displaces rotor 22 upward as depicted in FIG. 6, i.e. the value Z (FIG. 19) becomes positive; and when current i flows from node 338 to node 336, plunger coil 64 displaces rotor 22 downward, i.e. the value Z becomes negative. Such displacements depend on the position in which fan 100 must operate, and produce a corresponding change in the magnitude and (if applicable) direction of force Fz.

FIG. 11 is a schematic overview showing four different basic types of passive non-contact magnetic radial bearings that can be used in the context of the present invention. These are each arranged between a shaft 34 and a stator 50. In principle, the force exerted by the ring magnets can be either repulsive or attractive.

The ring magnets can be stacked. This allows the ratio of radial stiffness to magnet volume to be raised. Stack numbers of any size are possible. FIG. 11 shows, as examples, stack numbers n=1 and n=2. Passive radial journaling can also be implemented in the context of the invention by way of permanent magnets having a radial magnetization direction.

The top row depicts at the left a single-ring bearing 250 that is based on the repulsion principle (magnetic repulsion of like poles), and at the right depicts a so-called stacked bearing 254 having n=2 ring magnets, which is likewise based on the repulsion principle.

The bottom row depicts at the left a single-ring bearing 258 that is based on the attraction principle, i.e. on the principle of magnetic attraction between North and South poles, and at the right depicts a stacked bearing 262 that is again based on the principle of magnetic attraction.

All four bearing types can be used in the context of the present invention. The exemplifying embodiment that is depicted uses, by way of example, stacked bearings having n=2 rings that operate on the repulsion principle and are magnetized in an axial direction.

Bearing 250 of FIG. 11 uses a stationary ring magnet 264 that is axially magnetized, and it uses a rotating ring magnet 266 that is also axially magnetized. Located between rings 264, 266 is a (magnetic) air gap 268. As is apparent, the North pole of ring 264 is located in each case opposite the North pole of ring 266, and likewise the South pole of ring 264 is located opposite the South pole of ring 266. The repulsion between the poles generates the magnetic radial bearing effect. The instability of bearing 250 in an axial direction is evident, i.e. the position of shaft 34 in an axial direction must be defined by a suitable axial bearing.

Bearing 254 of FIG. 11 uses two stationary, axially polarized ring magnets 270, 272 that abut against one another with their North poles and are stacked above one another. It also uses two rotating, axially polarized ring magnets 274, 276 that are stacked above one another and abut against one another with their North poles. The manner of operation is explained below with reference to FIG. 14 and FIG. 15 and, as in the case of bearing 250, is based on the radial repulsion of like poles. In bearing 254, the air gap is labeled 278.

Bearing 258 of FIG. 11 has a stationary, axially magnetized ring magnet 280 that has a North pole at the top and a South pole at the bottom. It also has an axially magnetized ring magnet 282, mounted on shaft 34 and rotating therewith, that has at the bottom a South pole and at the top a North pole that is located opposite the South pole of ring magnet 280 and is separated therefrom by an air gap 284.

When ring 282 moves in a radial direction, the attraction between rings 280, 282 increases and urges shaft 34 into a position that is concentric with ring magnet 280. The instability in an axial direction is obvious, since rings 280, 282 attract one another in an axial direction. This instability can, however, be mitigated by configuring the other radial bearing in mirror-image fashion to radial bearing 258.

Bearing 262 of FIG. 11 has an external, stationary, axially magnetized ring magnet 288 in which the South pole is at the top; and, concentrically in ring 288, bearing 262 has an internal, stationary, axially magnetized ring magnet 290 in which the North pole is at the top. Rings 288, 290 are thus stacked in a radial direction.

Located on shaft 34 on the inside is an axially magnetized ring magnet 292 in which the North pole is at the top, and this ring 292 is surrounded by an axially magnetized ring magnet 294 in which the South pole is at the top. A flat (planar) air gap 296 separates the stationary ring pair 288, 290 from the rotating ring pair 292, 294. A South pole of stationary ring 290 is consequently located opposite a North pole of rotating ring 292, and a North pole of stationary ring 288 is located opposite a South pole of rotating ring 294. This pairing counteracts any radial displacement of shaft 34. Further explanations in connection with FIG. 12 and FIG. 16.

FIG. 12 once again depicts bearing 262 according to FIG. 11, and FIG. 13 shows the pertinent flux line profile. Because unlike poles are located opposite one another in all cases here, very short field lines occur. For example, when the North pole of rotating ring magnet 292 is displaced radially to the left, it comes increasingly into a position opposite the North pole of ring magnet 288 and is repelled by it, and at the same time the attraction between this North pole of rotating ring magnet 292 and the South pole of stationary ring magnet 290 decreases, thus generating the non-contact radial bearing effect, provided an axial bearing is present which counteracts an axial displacement between the rotating and stationary rings.

FIG. 14 once again shows stacked bearing 254 according to FIG. 11, which operates according to the repulsion principle. Its advantage is the symmetrical structure in the axial direction. The two stationary ring magnets 270, 272 are identical, and each has a height a. The two rotating ring magnets 274, 276 are also identical, and each has a height a.

FIG. 15 shows the field line profile in stacked bearing 254. The reference numerals are the same as in FIG. 11. Here like poles are adjacent in each case, i.e. a strong repulsion occurs in air gap 278 and generates the radial bearing effect.

Because like poles are located opposite each other in an axial direction in the configuration of FIG. 15, a risk exists that the ring magnets will demagnetize one another over the long term. It may be advantageous for this reason to arrange, according to FIG. 16, a soft-ferromagnetic ring 300 between stationary ring magnets 270, 272, and likewise a soft-ferromagnetic ring 302 between rotating ring magnets 274, 276. These counteract such a demagnetization and are particularly favorable for operation at higher temperatures. Alternatively, rings 300, 302 can also be made of a nonmagnetic material, e.g. a plastic.

FIG. 16 thus represents a variant of FIG. 15 and can likewise be used advantageously in the context of the invention.

FIG. 17 shows, in various axial positions, radial bearing 254 as used in the exemplifying embodiment for radial bearings 16 and 18. In practice, the inner part of radial bearing 254 performs only small axial movements which moreover, for safety, are limited by stops and by value limitations in the program of control arrangement 198, i.e. the values of certain parameters are automatically limited by the program.

Depiction B) of FIG. 17 shows radial bearing 254 in its zero position (Z=0). In this position, bearing 254 generates no axial force and is in axial equilibrium, i.e. Fz=0. The radial stiffness Sr of bearing 254 is at its maximum, i.e. fan 100 should be operated so that its two radial bearings 16, 18 are simultaneously in the vicinity of Z=0 and are moving synchronously when moving in an axial direction. When the one radial bearing 16 has a value Z=0 as a result of the location of shaft 34, the other, identical, radial bearing 18 should likewise have a value Z=0. Also conceivable, however, are cases in which a first force from radial bearing 16 is superimposed on a second force from radial bearing 18, and these two forces are of different magnitudes.

Depiction A) of FIG. 17 shows a state in which shaft 34 is displaced upward relative to depiction B) by a distance that is less than a/2, i.e. less than half the thickness a of one ring magnet. An upward force Fz is thereby created, and stiffness Sr is reduced.

Depiction C) of FIG. 17 shows a state in which shaft 34 is displaced downward relative to depiction B) by a distance that is less than a/2. A downward force Fz is thereby created, and radial stiffness Sr is once again reduced.

FIG. 18 shows at A), by way of example, the curve for axial force Fz of bearing 254 as a function of axial displacement Z.

In FIG. 18, when Z=0 then Fz=0. When Z becomes negative, Fz then increases to a positive maximum 255 located at approximately −a/2, and then decreases again. When Z becomes positive, Fz then decreases to a minimum 257 located at +a/2, and then increases again.

Depiction B) of FIG. 18 shows the curve for radial stiffness Sr of bearing 254. Stiffness Sr has its maximum at Z=0 and decreases from there in both directions. The stiff region is crosshatched, and is located approximately between −a/2 and +a/2. What is used in practice is not the entirety of this region but usually only a small portion thereof in which stiffness Sr is particularly high, as is desirable for a good bearing system. Mechanical stops 261, 263 (FIG. 19) are arranged in this radially stable region.

FIG. 19 schematically shows an enlargement of portion XIX of FIG. 18. It is evident that for bearing 254, a first stop 261 is provided at location −Z0, i.e. below bearing 254 in FIG. 14; and a second stop 263 is provided at location +Z0, i.e. above bearing 254 in FIG. 14. (For a fan with a fixed installation position that does not change during operation, upper stationary stop 263 could be omitted.)

FIG. 19 also shows that radial bearing 254 generates at location −Z0 an axial force +Fz0 that, according to depiction C) of FIG. 17, acts downward; and that at location +Z0 it generates an axial force Fz0 upward, in accordance with depiction A) of FIG. 17.

The working region within which fan 100 works during operation is labeled 265, i.e. this region could be located, for example, between approximately −a/4 and approximately +a/4. The working point within region 265 depends on the various forces that act on rotor 22 during operation. A typical working point 273 is plotted.

FIG. 19 also depicts a curve 267 that shows the profile of axial force Fz as a function of displacement Z, and furthermore a straight line 269 that extends tangentially to curve 267 at the zero point and has, in working region 265, approximately the same course as curve 267.

When fan 100 has a general orientation corresponding to FIG. 3, shaft 34 is in position −Z0 at startup (FIG. 19), such that the value of Z0 can be approximately 0.3 mm; and it rests with a force Fz0 against stop 261. This position of shaft 34 is depicted in FIG. 21 and FIG. 22. It is evident that force Fz0 acts downward, i.e. in the "wrong" direction, if fan 100 has the orientation according to FIG. 21. FIG. 22 is an enlargement of a portion of FIG. 21 and shows (in greatly enlarged fashion) radial bearing 18 when fan 100 is in the idle state.

Startup is symbolized in FIG. 19 by an arrow 271. In this context, a corresponding starting current i is sent through plunger coil 64 so that rotor 22 is moved upward with reference to FIG. 3 or 21, and moves the two radial bearings 16, 18 into their working region 265 (FIG. 19) and to working point 273, so that rotor 22 levitates.

This state is shown in FIG. 6; for reasons of clarity, motor 52 is not depicted because it usually has only a small influence on the non-contact bearing system.

FIG. 24 shows a variant of the coil arrangement for an active magnetic axial bearing.

This arrangement has a supporting part 308 made of a soft-ferromagnetic material. Mounted on said part is a stationary pole core 310, and the latter is separated by an air gap 312 from a movable pole core 314 that is connected to the upper end (not depicted) of shaft 34.

Stationary pole core 310 and movable pole core 314 are surrounded by a stationary actuator coil 64'. When a current i is delivered to this coil, it generates a magnetic field 316 of the shape depicted, which attempts to make air gap 312 smaller; the result is that movable pole core 314 is pulled upward with a force Fz.

It is disadvantageous that an arrangement of this kind can generate only an upward force, which necessitates a corresponding invariable orientation of fan 100. If a force is to be generated in both directions, a corresponding arrangement must also be arranged at the lower end of the shaft.

The arrangement according to FIG. 24 is based on the so-called "Maxwell force," i.e. on the force acting at interfaces. The force acting on a plunger coil 64 (as in FIGS. 1 to 23), on the other hand, is based on the so-called "Lorentz force," i.e. on the force on a conductor that is located in a magnetic field and through which a current is flowing.

Controlled axial bearings based on the Lorentz force are preferred at present, since in them the direction of the force that is generated can be controlled by means of the direction of current i, and because the magnitude of the force can be controlled by means of the magnitude of the current, so that axial bearings operating with a Lorentz force are more versatile in terms of application. Plunger coil 64 moreover has a low inductance, since it has no parts made of ferromagnetic materials. It can therefore react very quickly to changes in current produced by current controller 202 (FIG. 20), so that oscillations are avoided. FIGS. 25 and 26 therefore show other configurations of axial bearings having a plunger coil.

FIG. 25 shows a first variant of the rotor configuration according to FIGS. 1 to 5. Shaft 34, eddy current sensor 33, radial bearings 16 and 18, motor 52, and fan blades 26 are not depicted, and their configuration can be identical to that in FIG. 1.

Second magnetic yoke 27, configured in a cup shape, carries on the inner side of its outer rim 28 a ring 334 made of permanently magnetic material that is magnetized radially, i.e. in FIG. 25 it has a continuous North pole on its inner side 336 and a continuous South pole on its outer side 338. Alternatively, of course, inner side 236 could have a South pole and outer side 338 a North pole.

Inner side 336 is separated by a cylindrical air gap 57" from the outer side of a magnetic yoke part 46'.

Projecting into cylindrical air gap 57" is air-core plunger coil 64 which, as in FIG. 2, is secured to stator-mounted supporting part 105.

The advantage as compared with FIG. 1 is that the zone in which a homogeneous radial magnetic field 55" is present can be larger than in the configuration according to FIGS. 1 and 4.

FIG. 26 shows a second variant in which, as in FIG. 25, shaft 34, position sensor 33, radial bearings 16 and 18, motor 52, and fan blades 26 are not depicted. These can be of the same configuration as in FIG. 1.

The second magnetic yoke, constructed in bell-shaped fashion and having first ring magnet 334, is configured in the same way as in FIG. 25, as is plunger coil 64.

Arranged here on outer periphery 47 of first magnetic yoke 46" is a second, inner ring magnet 342 whose outer periphery 344 faces toward cylindrical air gap 57'" and whose flux intensifies the flux of first ring magnet 334, so that a very homogeneous radial magnetic flux 55'" having a high magnetic flux density is obtained in air gap 57'".

Second ring magnet 342 is likewise radially magnetized, and in this example has a North pole on the inside and a South pole on its outer periphery 344.

A homogeneous magnetic field 55'" simplifies control of the axial position Z of rotor 22, and also simplifies generation of the axial force that is necessary at startup in order to bring rotor 22 into its equilibrium position.

The rotor configuration according to FIG. 1 could of course also be combined with an external ring magnet 334 such as the one depicted in FIG. 25. It appears important that cylindrical air gap 57, 57", 57'" can readily be combined with the motor-related elements of fan 100 without substantially increasing the physical volume of the fan.

FIG. 20 shows a preferred structure for control arrangement 198 that is used. A high control speed is important in any controller that needs to produce so-called levitation, i.e. in a digital controller the axial position Z of rotor 22 must be sensed as frequently as possible, e.g. at 100-μs intervals, and the instantaneous current i flowing through plunger coil 64 should likewise be measured at small intervals, in order to achieve good control results.

At a comparator 200, the desired current isoll in plunger coil 64 is compared with the actual current i. The latter is measured indirectly with current sensor 339 of FIG. 10. (The sign of current i is determined by the commutation signals of H-bridge 324.)

The difference between i and isoll yields a system deviation called $i_{dev}$ (current deviation), and this is delivered to a current controller 202 that controls the current in plunger coil 64. Controller 202 is a so-called "subordinate current controller," i.e. it works with a target value isoll that is supplied by a position controller 216. It generates at its output a voltage U that is required to produce a specific current isoll in plunger coil 64. This voltage U is calculated in controller 202, which is usually a proportional controller (P controller). Output voltage U is equal to $$U = k * i_{dev} \tag{2}$$

i.e. equal to the product of current deviation $i_{dev}$ and a constant factor k.

Subordinate current controller 202 can be omitted if a power electronics system with current imprinting (i.e. a constant-current controller) is used to stabilize axial position Z of fan wheel 25.

Position control is based on the fact that the integral of voltage over time (∫Udt), or alternatively the integral of current over time (∫idt), becomes zero when fan wheel 25 is in an axial position Z in which forces Fw and Fz (FIG. 6) cancel one another out. No current flows in plunger coil 64 in this case, with the exception of small correction currents that are necessary for continuously maintaining this position Zsoll.

Actual voltage U is therefore obtained at output 204 of current controller 202. This voltage is delivered to a comparator 206 and compared there with target voltage Usoll=0 from a target voltage generator 208. This target voltage has a value of zero because a favorable energy balance for fan 100 can thereby be achieved. The difference between target voltage Usoll and actual voltage U yields a voltage deviation $U_{dev}$, and this is applied to a controller 210 that can be referred to as a "higher-order position servo-control system" or "outer loop controller."

The purpose of controller 210 is to ascertain the "zero-force" position according to FIG. 6 in which the downward-acting force Fw (weight of rotor 22, etc.) is exactly balanced out by the upward-acting total force Fz of the two radial bearings 16, 18.

In this balanced state, the average value of voltage U (or of current i) over time has a value of zero. Controller 210 is therefore preferably configured as an integral controller.

Upon initialization of arrangement 198 after being switched on, value $Z_{soll}$ at output 211 is set to zero. Then, in each sampling step of the digital controller, the instantaneous voltage U at output 204 is multiplied by a factor k and added to the value $Z_{soll}$ of the previous sampling step, provided the absolute value of $Z_{soll}$ does not then exceed a threshold $Z_{soll,max}$.

At switch-on, therefore:

$$Z_{soll0}=0 \quad (3).$$

After the first sampling step:

$$Z_{soll1}=Z_{soll0}+k*U_1 \quad (4).$$

After the second sampling step:

$$Z_{soll2}=Z_{soll1}+k*U_2 \quad (5).$$

After the n-th sampling step:

$$Z_{solln}=Z_{soll(n-1)}+k*U_n \quad (6).$$

Digital integration proceeds continuously in this fashion. $U_1, U_2, U_3, U_n$, etc. are the voltage values at output 204 during the relevant sampling step 1, 2, 3, n, . . . .

This integration by controller 210 proceeds continuously, and a very stable value for $Z_{soll}$ is thereby obtained during operation at nominal rotation speed, i.e. only extremely small axial motions then take place between stator 50 and rotor 22.

The value Zsoll is delivered to a comparator 214 and compared there with the value Z for the actual position, which value is measured with eddy current sensor 33 (or with any other position sensor). The difference between Z and Zsoll is designated Zdev and is delivered to a position controller 216 (PD controller) at whose output the value isoll for the target current is obtained, which value is delivered to comparator 200 (already described).

The value isoll is set to zero upon initialization of fan 100. (The value isoll can be positive or negative during operation.)

In each sampling step of digital controller 198, the instantaneous target current isoll1 is calculated in PD controller 216 as the weighted sum of target current isoll0 of the previous sampling step, the instantaneous position error Zdev1, and the position error Zdev0 of the previous sampling step, i.e.:

$$isoll=k1*isoll0+k2*Zdev1+k3*Zdev0 \quad (7).$$

k1, k2, and k3 here are constants that serve to weight the values isoll0, ZdevC, and Zdev1, and that must be ascertained using corresponding control loop simulators when a new fan is designed.

The position servo-control system (controller 210) functions as follows:

Passive radial bearings 16, 18 form a stable non-contact bearing system in the radial direction but are unstable in an axial direction, i.e. depending on their axial location they pull rotor 22 in one or the other axial direction; cf. illustration A) in FIG. 18, where the axial force Fz is depicted as a function of Z.

Other forces also act in an axial direction, for example the weight of rotor 22, air-related forces, etc. The force generated by plunger coil 64 likewise acts in an axial direction.

For this system of forces, controller 210 that serves for position servocontrol calculates, for the position of rotor 22, an optimum value Zsoll at which this system of forces can be kept in equilibrium with a minimum energy expenditure. This is achieved by way of the value Usoll−0 from target value generator 208. FIG. 19 shows, by way of example, one conceivable working point 273 defined by one such value Zsoll.

This "zeroing out" of the forces acting on rotor 22 is achieved by means of very small changes in the value Zsoll, i.e. the relative position of stator 50 and rotor 22; thus when rotor 22 is in the location according to FIG. 6, its position is shifted slightly upward (e.g. by 0.05 mm), and if fan 100 is turned upside down, the target position of rotor 22 is displaced a similar distance in the opposite direction. This can also be expressed as follows: the magnetic forces generated in an axial direction by radial bearings 16, 18 are utilized in order to hold rotor 22, with minimal energy expenditure, in a current-saving position Zsoll in which the forces acting on rotor 22 are in equilibrium and rotor 22 therefore "levitates" with no need for an appreciable current to flow through plunger coil 64 for that purpose. This is comparable to a surfer who is carried, and kept in equilibrium, by the wave as long as he correctly executes the necessary minimal control movements.

This axial position Zsoll of rotor 22 is unstable by nature and must therefore be constantly readjusted; very small correction currents in plunger coil 64 are nevertheless sufficient for this purpose, the integral of these correction currents over time having a value of approximately zero when the value Zsoll is optimum.

FIG. 21 and FIG. 22 are a depiction of fan 100 analogous to FIG. 3, but whereas FIG. 3 shows the fan in its operating state in which shaft 34 is levitating, FIGS. 21 and 22 show fan 100 in the zero-current state in which the lower end of shaft 34 is braced against washer 72. It is evident that the inner rings of the two radial bearings 16, 18 are offset a distance of approximately a/4 (FIG. 18) downward, thus producing a considerable magnetic force Fz that acts downward and must be overcome at startup by the force of plunger coil 64, so that fan 100 can achieve rotation in the levitated state before being switched on. This offset should if possible be smaller than a/2, since otherwise the force Fz0 becomes very large and a large current i in plunger coil 64 is required at startup in order to overcome the sum of the forces (Fw+Fz0).

Startup Procedure

The starting point is the switched-off zero-current state in which rotor 22 is at a standstill. Radial bearings 16, 18 together generate an axial force Fz0 (FIG. 21) that pushes shaft 34 against a mechanical stop, e.g. stop 72 as depicted in FIG. 21. Radial bearings 16, 18 produce a non-contact radial centering of shaft 34 but do not yet occupy their operating position. This is evident in FIG. 21 from the fact that force Fz0 is acting in the wrong direction.

With the application of a supply voltage to fan 100, digital electronic signal system DSP 76 begins execution of a start routine S310 that is depicted in FIG. 22. This firstly, in S312, causes the values Zsoll and isoll to be set to zero, and causes polling of the voltage target value Usoll, which is preferably 0 V. According to equation (6), the stepwise (iterative) process of optimizing Zsoll begins in S314. In S316 a first value isoll is calculated according to equation (7), and in S318 a value U, i.e. the voltage that is to be applied to plunger coil 64, is calculated according to equation (2).

In S320 an axial position Z is established by application of this voltage U to plunger coil 64. In S322 the current i in plunger coil 64 is measured, and the measured value is fed back to step S318. In step S324 the instantaneous value Z of the axial position is measured by means of sensor 33.

The calculated value U is fed back to step S314 and serves there, in accordance with equation (6), to calculate a new value for Zsoll. The measured value Z is fed back to step S316 and serves there to calculate a new value for isoll. The measured current i is fed back to step S318 and serves there for calculation of a new voltage U.

The current i, and therefore the position Z, are modified in this fashion until the axial forces are in equilibrium.

Fan 100 is then switched on, i.e. fan wheel 25 is driven by motor 52, and control arrangement 198 automatically performs necessary corrections to Z when the axial forces change as a result of operation of the fan. Rotor 22 is therefore now no longer touching stator 50, and the entire system is journaled in non-contact fashion by magnetic forces. Fan wheel 25 is held in this levitating position by active axial bearings 57, 64 and passive radial bearings 16, 18. The ring magnets of first and second axial bearings 16 and 18 are each located very close to an associated alignment plane, as shown particularly well by FIGS. 3 and 6. In FIG. 6, the distance from the associated alignment plane is labeled Z.

OPERATION

From the moment the active axial bearing is activated, in step S324 (FIG. 22) the distance Z between stator 50 and rotor 22 is measured at closely spaced time intervals, e.g. every 100 µs. The voltage U to be applied to plunger coil 64 is calculated in accordance with the method described (position servo-control system 210, position controller 216, and current controller 202 in FIG. 20). The value for this voltage U is transmitted to a power electronics system, which makes available the current necessary for plunger coil 64. Alternatively, if this power electronics system itself contains a current control system, the power electronics system directly transmits a value for an instantaneously required target current isoll. Current i can be controlled using ON-OFF switched transistors, i.e. transistors that are alternately switched completely off and completely on (cf. FIG. 10) or, for example, using an analog amplifier. The control approach is, however, not linked to the aforementioned principles, so that further variants and modifications are possible.

During operation, a variety of forces can occur in the axial direction: permanent-magnet forces; dynamic axial forces (due to inertia); weight forces in the context of a vertical rotor axis; electromagnetic forces; flow forces, as applicable; and other interference forces. The steady-state forces are compensated for by a corresponding modification of force Fz, by the fact that the variable Z is modified by the actively controllable magnetic axial bearing (plunger coil 64) (cf. FIG. 18).

Different forces can likewise occur in the radial direction: static and dynamic imbalance forces; dynamic radial forces resulting from inertia and gyroscopic effects; drive-related radial forces; weight forces in the context of a horizontal rotor axis; and other interference forces.

These forces are handled by passive radial bearings 16, 18. Excessive tilting of fan wheel 25 is also prevented by radial bearings 16, 18. When interfering or perturbing forces are very high, touchdown bearings (emergency bearings) temporarily take over radial and axial guidance of rotor 22.

The state of the system is constantly checked during operation. This includes monitoring of the active magnetic bearing, the drive system, and the electronics, so that the value Z is adaptively adjusted to the particular operating conditions.

One example is monitoring of the temperature of plunger coil 64 in order to protect it from overheating. One possible embodiment is estimating the present coil temperature with the aid of a thermal model located in the signal electronics. Thermal models of this kind are known from motor circuit breakers, and will therefore not be described further.

In the context of the invention, therefore, a fan 100 has an electronically commutated drive motor 52 to drive fan blades 26. This drive motor 52 has a stator 50 connected to a bearing tube 54, and a rotor 22 equipped with a shaft 34. Shaft 34 is journaled in radial, non-contact fashion in bearing tube 54 by means of passive radial magnetic bearings 16, 18. It is axially displaceable relative to bearing tube 54 and is drivingly connected to a rotor magnet 44 that comprises a first magnetic yoke 46. Also provided is a second magnetic yoke 27, connected to shaft 34 and of approximately cup-shaped configuration, in which inner side 59 of outer rim 28 constitutes an outer boundary for a substantially cylindrical air gap 57 in which a radial magnetic flux 55' proceeds in a predetermined direction during operation. Also provided is a plunger coil 64 that extends into cylindrical air gap 57 and is mechanically connected to bearing tube 54 so that, upon an axial displacement of plunger coil 64 relative to cylindrical air gap 57, the location of shaft 34 relative to bearing tube 54 changes. This allows the magnetic bearing system to be brought, practically without power expenditure, into a state of levitation.

Many variants and modifications are of course possible within the scope of the present invention. For example, other types of motor can also be used within the scope of the invention, e.g. internal- or external-rotor motors, and in particular motors that generate few or no radial forces in the context of an offset of the rotor from the center of the stator bore. Magnetic flux 55', 55", 55''' in cylindrical air gap 57, 57", 57''' can also be generated by a variety of arrangements of permanent magnets, the examples depicted not being exhaustive.

What is claimed is:

1. A fan having an electronically commutated drive motor for driving fan blades, which drive motor comprises
   a stator;
   a rotor equipped with a shaft, which shaft is radially journaled in non-contact fashion on the stator using permanent magnets and is axially displaceable relative to the stator and is drivingly connected to the rotor, which rotor is in turn drivingly connected to
   a fan wheel whose interior defines
   a cylindrical air gap in which, during operation, a substantially radial magnetic flux extends in a predetermined direction,
   a plunger coil which extends into the cylindrical air gap and to which the stator is mechanically connected, so that, upon an axial displacement of the shaft relative to the stator, a relative location, of the plunger coil with respect to the cylindrical air gap, changes, and
   an axially-magnetized permanent magnet which generates a magnetic flux in the cylindrical air gap, said permanent magnet having, associated with it, a flux-conducting piece that has an approximately cylindrically configured external periphery which defines a radially inner boundary of the cylindrical air gap.

2. The fan according to claim 1, further comprising
   a non-contact position sensor for quantitative sensing of the relative position of the stator with respect to the shaft.

3. The fan according to claim 2, wherein the position sensor is implemented as an eddy current sensor.

4. The fan according to claim 3, wherein the eddy current sensor comprises
a sensor coil to which an AC signal is delivered during operation, and having associated therewith
an electrically conductive part whose distance from the sensor coil is a function of the position of the shaft relative to the stator.

5. The fan according to claim 4, wherein the sensor coil is arranged on the stator.

6. The fan according to claim 4, wherein the electrically conductive part is configured as a hub of the rotor and is interactive with the sensor coil so that damping of the sensor coil by the electrically highly conductive part is a function of a position of the shaft relative to the stator.

7. The fan according to claim 1, wherein
the axially magnetized permanent magnet is magnetized continuously as a North pole at its one axial end and continuously as a South pole at its other axial end.

8. The fan according to claim 7, further comprising
two magnetic yoke parts, said axially magnetized permanent magnet being arranged between the two magnetic yoke parts.

9. The fan according to claim 8, further comprising
a soft-ferromagnetic part arranged in the rotor which serves both as a flux-conducting piece and as a first magnetic yoke part for the rotor magnet of the electronically commutated motor.

10. The fan according to claim 9, wherein the drive motor further comprises a rotor magnet, and
said rotor magnet
the flux-conducting part, and
the permanent magnet serving to generate the flux
in the air gap are arranged as a sandwich.

11. A fan having an electronically commutated drive motor for driving fan blades, which drive motor comprises
a stator;
a rotor equipped with a shaft, which shaft is radially journaled in non-contact fashion on the stator using permanent magnets and is axially displaceable relative to the stator and is drivingly connected to the rotor, which rotor is in turn drivingly connected to
a fan wheel whose interior defines a cylindrical air gap in which, during operation, a substantially radial magnetic flux extends in a predetermined direction,
a plunger coil which extends into the cylindrical air gap and to which the stator is mechanically connected, so that, upon an axial displacement of the shaft relative to the stator, a relative location, of the plunger coil with respect to the cylindrical air gap, changes,
wherein the drive motor defines a planar air gap,
a so-called air-core winding is arranged in the planar air gap, secured against rotation relative to the rotor, and
said plunger coil is mounted on a support element for the air-core winding.

12. A fan having an electronically commutated drive motor for driving fan blades, which drive motor comprises
a stator;
a rotor equipped with a shaft, which shaft is radially journaled in non-contact fashion on the stator using permanent magnets and is axially displaceable relative to the stator and is drivingly connected to the rotor, which rotor is in turn drivingly connected to
a fan wheel whose interior defines a cylindrical air gap in which, during operation, a substantially radial magnetic flux extends in a predetermined direction,
a plunger coil which extends into the cylindrical air gap and to which the stator is mechanically connected, so that, upon an axial displacement of the shaft relative to the stator, a relative location, of the plunger coil with respect to the cylindrical air gap, changes, and
a position controller which, in operation, automatically controls the position of the shaft relative to the stator, said position controller comprising a digital signal processor which also serves to control commutation of the electronically commutated motor.

13. The fan according to claim 12, further comprising, in order to control positioning of the shaft relative to the stator,
a current controller for the current in the plunger coil, to which controller a target current is specified as a function of
any difference between the actual position and the desired position of the shaft.

14. The fan according to claim 13, wherein when the actual position of the plunger coil and the desired position of the plunger coil are coincident, the target current has a time-averaged value of substantially zero.

15. The fan according to claim 13, further comprising, for specifying a target position of the shaft relative to the stator, a higher-order position servo-control system, in order to facilitate compensation for stationary axial forces.

16. The fan according to claim 15, wherein the servo-control system is so configured that, in operation,
as a function of any difference (idev) between the target current (isoll) and the actual value (I) of the current in the plunger coil,
it calculates a voltage (U) and compares it with a predetermined target voltage (Usoll), any difference between these voltages being summed and serving, as a function of the instantaneous magnitude of the sum, to calculate a target position (Zsoll) for the position controller.

17. The fan according to claim 12, further comprising
a passive bearing arrangement having permanent magnets, which arrangement is configured to move the rotor into a desired target position when the plunger coil is currentless.

18. The fan according to claim 17, further comprising
two passive magnetic radial bearings on the shaft, each of which bearings is implemented as a stacked bearing of a plurality of axially magnetized rings.

19. The fan according to claim 17, wherein the shaft is equipped with at least one mechanical touchdown bearing, configured as an axial bearing, and arranged at a free end of said shaft.

20. A fan, comprising
a rotor;
a stator;
at least one permanent magnet passive radial magnetic bearing system;
at least one actively controllable axial magnetic bearing; wherein:
a first magnetic bearing arrangement is mounted on the rotor of the fan, and comprises at least one magnet;
a second magnetic bearing arrangement is arranged on the stator of the fan and comprises at least one magnet; and
an electromagnetic arrangement is located inside the fan, and, in operation, controls an axial position (Z) of the rotor relative to the stator,
said stator and rotor forming part of an electronically commutated motor, and wherein
an apparatus for temporary modification of the relative position of the rotor and stator is provided, in order to modify a radial stiffness (Sr) of the permanent-magnet passive radial bearing system and thus to modify a resonant frequency of the fan upon ramp-up or upon passage through a critical rotation-speed range.

21. The fan according to claim 20, further comprising
an intermediate element, arranged between two adjacent magnetic rings, said element comprising material which is not strongly ferromagnetic.

22. The fan according to claim 20, wherein
a passive radial bearing system is provided,
compensation for internal and external perturbing forces being accomplished, at least partially, using axial forces of said passive radial bearing system, and
whose magnitude is controllable by a corresponding displacement of the rotor with respect to the stator.

23. The fan according to claim 20, further comprising,
in order to control a position of said electromagnetic arrangement,
a control arrangement including
a position servo-control system receiving an input signal (Udev),
a position controller coupled to an output of said servo-control system, and
a current controller coupled to an output of said position controller.

24. The fan according to claim 20, wherein
the electromagnetic arrangement forms a magnetic circuit such that axial forces act on at least one ferromagnetic interface in a way which is measured, in order to produce a change in the position of the rotor.

25. The fan according to claim 20, further comprising
at least one damping member which, in operation, damps oscillations in the fan.

* * * * *